(12) United States Patent
Wilson et al.

(10) Patent No.: US 12,521,530 B2
(45) Date of Patent: Jan. 13, 2026

(54) INTRAVASCULAR DEVICES AND METHODS FOR DELIVERY OF FLUIDS AND THERAPEUTIC AGENTS INTO BLOOD VESSEL WALLS AND INTRAVASCULAR STRUCTURES

(71) Applicant: INTERVENE, INC., Redwood City, CA (US)

(72) Inventors: Fletcher T. Wilson, San Francisco, CA (US); Jeffrey M. Elkins, Woodside, CA (US); Kent D. Dell, Redwood City, CA (US); Herbert Mendoza, South San Francisco, CA (US); Michi E. Garrison, Half Moon Bay, CA (US)

(73) Assignee: INTERVENE, INC., Redwood City, CA (US)

( * ) Notice: Subject to any disclaimer, the term of this patent is extended or adjusted under 35 U.S.C. 154(b) by 0 days.

(21) Appl. No.: 17/378,446

(22) Filed: Jul. 16, 2021

(65) Prior Publication Data

US 2022/0016397 A1    Jan. 20, 2022

Related U.S. Application Data

(60) Provisional application No. 63/167,633, filed on Mar. 29, 2021, provisional application No. 63/061,108, (Continued)

(51) Int. Cl.
*A61M 25/06* (2006.01)
*A61M 25/00* (2006.01)
*A61M 25/09* (2006.01)

(52) U.S. Cl.
CPC ...... *A61M 25/0631* (2013.01); *A61M 25/007* (2013.01); *A61M 25/0075* (2013.01);
(Continued)

(58) Field of Classification Search
CPC .......... A61B 17/3478; A61B 17/00778; A61B 1/3137; A61B 1/00082; A61B 1/0008;
(Continued)

(56) References Cited

U.S. PATENT DOCUMENTS 3,704,711 A    12/1972  Part
4,794,931 A *   1/1989  Yock .............. A61B 17/320783
(Continued)

FOREIGN PATENT DOCUMENTS

CA    1281381 C    3/1991
CA    2678971 A1    8/2008
(Continued)

OTHER PUBLICATIONS

Corcos, I., "A new autologous venous valve by intimal flap: One Cases report." Note Di Tecnica, Minerva Cardioangiol, 2003, 51, 10 pages.
(Continued)

*Primary Examiner* — Michael J Tsai
*Assistant Examiner* — Kathleen Paige Farrell
(74) *Attorney, Agent, or Firm* — Perkins Coie LLP

(57) ABSTRACT

Intravascular devices and methods for intramural delivery of dissection fluids and infusates are disclosed herein. In some embodiments, the systems include an infusion assembly that can access a vessel wall at a depth within a layer of the vessel wall and advance a tissue manipulation component at approximately the same depth within the vessel wall to create an intramural space within the vessel layer. The infusion assembly can further deliver an infusate that includes a therapeutic drug or other agent into the intramural space.

13 Claims, 18 Drawing Sheets

Related U.S. Application Data filed on Aug. 4, 2020, provisional application No. 63/052,900, filed on Jul. 16, 2020.

(52) U.S. Cl.
CPC ..... *A61M 25/09* (2013.01); *A61M 2025/0057* (2013.01); *A61M 2025/09008* (2013.01); *A61M 2202/0478* (2013.01); *A61M 2210/12* (2013.01)

(58) Field of Classification Search
CPC ........ A61B 17/3496; A61B 17/320016; A61B 17/3203; A61B 17/3207; A61B 5/6853; A61B 17/12109; A61B 17/320783; A61B 2017/00783; A61M 25/0071; A61M 2025/09008; A61M 2025/0089; A61M 25/0084; A61M 2005/342; A61F 2/2475
See application file for complete search history.

(56) References Cited

U.S. PATENT DOCUMENTS

| | | | |
|---|---|---|---|
| 4,898,574 A | 2/1990 | Uchiyama et al. | |
| 4,932,962 A | 6/1990 | Yoon et al. | |
| 5,112,339 A | 5/1992 | Zelman et al. | |
| 5,190,046 A | 3/1993 | Shturman et al. | |
| 5,372,601 A | 12/1994 | Lary | |
| 5,443,443 A | 8/1995 | Shiber | |
| 5,464,395 A | 11/1995 | Faxon et al. | |
| 5,601,588 A | 2/1997 | Tonomura et al. | |
| 5,606,975 A | 3/1997 | Liang et al. | |
| 5,695,507 A | 12/1997 | Auth et al. | |
| 5,738,901 A | 4/1998 | Wang et al. | |
| 5,795,322 A | 8/1998 | Boudewijn | |
| 5,810,847 A | 9/1998 | Laufer et al. | |
| 5,836,945 A | 11/1998 | Perkins | |
| 5,882,340 A | 3/1999 | Yoon | |
| 5,989,276 A | 11/1999 | Houser et al. | |
| 6,190,353 B1 | 2/2001 | Makower | |
| 6,217,554 B1 * | 4/2001 | Green | A61M 25/0084 |
| 6,302,870 B1 | 10/2001 | Jacobsen et al. | |
| 6,344,027 B1 | 2/2002 | Goll | |
| 6,375,635 B1 | 4/2002 | Moutafis et al. | |
| 6,379,319 B1 | 4/2002 | Garibotto et al. | |
| 6,458,098 B1 | 10/2002 | Kanesaka | |
| 6,475,226 B1 | 11/2002 | Belef et al. | |
| 6,506,178 B1 | 1/2003 | Schubart et al. | |
| 6,514,217 B1 | 2/2003 | Selmon et al. | |
| 6,524,251 B2 | 2/2003 | Rabiner et al. | |
| 6,676,665 B2 | 1/2004 | Foley et al. | |
| 6,685,648 B2 | 2/2004 | Flaherty et al. | |
| 6,692,466 B1 | 2/2004 | Chow | |
| 6,702,744 B2 | 3/2004 | Mandrusov | |
| 6,726,677 B1 | 4/2004 | Flaherty et al. | |
| 6,758,836 B2 | 7/2004 | Zawacki | |
| 6,902,576 B2 | 6/2005 | Drasler et al. | |
| 7,008,411 B1 | 3/2006 | Mandrusov et al. | |
| 7,056,325 B1 | 6/2006 | Makower et al. | |
| 7,150,738 B2 | 12/2006 | Ray | |
| 7,179,249 B2 | 2/2007 | Steward et al. | |
| 7,273,469 B1 | 9/2007 | Chan et al. | |
| 7,357,795 B2 | 4/2008 | Kaji et al. | |
| 7,462,170 B2 * | 12/2008 | Fournie et al. | A61M 39/223 |
| 7,517,352 B2 | 4/2009 | Evans | |
| 7,775,968 B2 | 8/2010 | Viathis | |
| 7,780,592 B2 | 8/2010 | Tronnes | |
| 7,918,870 B2 | 4/2011 | Kugler et al. | |
| 7,927,305 B2 | 4/2011 | Yribarren et al. | |
| 7,938,819 B2 | 5/2011 | Kugler et al. | |
| 7,955,346 B2 | 6/2011 | Mauch et al. | |
| 8,025,655 B2 | 9/2011 | Kugler et al. | |
| 8,083,726 B1 * | 12/2011 | Wang | A61L 27/3873 623/1.38 |
| 8,083,727 B2 | 12/2011 | Kugler et al. | |
| 8,100,860 B2 | 1/2012 | Von Oepen et al. | |
| 8,114,123 B2 | 2/2012 | Brenzel et al. | |
| 8,177,748 B1 | 5/2012 | Beyerlein | |
| 8,177,802 B2 | 5/2012 | Mauch et al. | |
| 8,267,947 B2 | 9/2012 | Pantages et al. | |
| 8,323,261 B2 | 12/2012 | Kugler | |
| 8,460,316 B2 | 6/2013 | Wilson et al. | |
| 8,636,712 B2 | 1/2014 | Kugler et al. | |
| 8,753,366 B2 | 6/2014 | Makower et al. | |
| 9,320,504 B2 | 4/2016 | Wilson et al. | |
| 9,381,034 B2 | 7/2016 | Kawwei | |
| 9,545,289 B2 | 1/2017 | Wilson et al. | |
| 9,814,538 B2 | 11/2017 | Kugler et al. | |
| 9,827,005 B2 | 11/2017 | Wilson et al. | |
| 9,949,752 B2 | 4/2018 | Wilson et al. | |
| 9,955,990 B2 | 5/2018 | Wilson et al. | |
| 10,105,157 B2 | 10/2018 | Wilson et al. | |
| 10,188,419 B2 | 1/2019 | Wilson et al. | |
| 10,231,613 B2 | 3/2019 | Wilson et al. | |
| 10,292,807 B2 | 5/2019 | Wilson et al. | |
| 10,603,018 B2 | 3/2020 | Wilson et al. | |
| 10,646,247 B2 | 5/2020 | Wilson et al. | |
| 10,874,413 B2 | 12/2020 | Wilson et al. | |
| 2001/0041899 A1 | 11/2001 | Foster | |
| 2002/0029052 A1 | 3/2002 | Evans et al. | |
| 2002/0072706 A1 | 6/2002 | Hiblar et al. | |
| 2002/0091362 A1 | 7/2002 | Maginot | |
| 2002/0103459 A1 | 8/2002 | Sparks et al. | |
| 2002/0148475 A1 | 10/2002 | Johnson et al. | |
| 2003/0125663 A1 | 7/2003 | Coleman et al. | |
| 2003/0144670 A1 | 7/2003 | Pavcnik et al. | |
| 2004/0158143 A1 | 8/2004 | Flaherty et al. | |
| 2004/0167558 A1 | 8/2004 | Igo et al. | |
| 2004/0215339 A1 | 10/2004 | Drasler et al. | |
| 2005/0014995 A1 | 1/2005 | Amundson et al. | |
| 2005/0075665 A1 | 4/2005 | Brenzel et al. | |
| 2005/0165466 A1 | 7/2005 | Morris et al. | |
| 2005/0273159 A1 | 12/2005 | Opie | |
| 2006/0094929 A1 | 5/2006 | Tronnes | |
| 2006/0136045 A1 | 6/2006 | Flagle et al. | |
| 2006/0156875 A1 | 7/2006 | McRury et al. | |
| 2006/0178646 A1 | 8/2006 | Harris et al. | |
| 2006/0184187 A1 | 8/2006 | Surti | |
| 2006/0235449 A1 | 10/2006 | Schubart et al. | |
| 2006/0271090 A1 | 11/2006 | Shaked et al. | |
| 2007/0005093 A1 | 1/2007 | Cox et al. | |
| 2007/0093780 A1 | 4/2007 | Kugler | |
| 2007/0093781 A1 | 4/2007 | Kugler et al. | |
| 2007/0123821 A1 * | 5/2007 | Wang et al. | A61B 5/1444 |
| 2007/0129628 A1 | 6/2007 | Hirsh | |
| 2007/0208368 A1 | 9/2007 | Katoh et al. | |
| 2008/0033467 A1 | 2/2008 | Miyamoto et al. | |
| 2008/0103480 A1 | 5/2008 | Bosel et al. | |
| 2008/0228171 A1 | 9/2008 | Kugler et al. | |
| 2008/0228211 A1 | 9/2008 | Gonon | |
| 2008/0243065 A1 | 10/2008 | Rottenberg et al. | |
| 2008/0255595 A1 | 10/2008 | Buchbinder et al. | |
| 2009/0005793 A1 | 1/2009 | Pantages et al. | |
| 2009/0112059 A1 | 4/2009 | Nobis | |
| 2009/0149739 A9 | 6/2009 | Maschke | |
| 2009/0182192 A1 | 7/2009 | Shiono et al. | |
| 2009/0209910 A1 | 8/2009 | Kugler et al. | |
| 2009/0254051 A1 | 10/2009 | Von Oepen et al. | |
| 2009/0270799 A1 | 10/2009 | Seto et al. | |
| 2010/0076476 A1 | 3/2010 | To et al. | |
| 2010/0152843 A1 | 6/2010 | Mauch et al. | |
| 2010/0241147 A1 | 9/2010 | Maschke | |
| 2010/0256599 A1 | 10/2010 | Kassab et al. | |
| 2011/0238038 A1 * | 9/2011 | Sefi et al. | A61M 2005/342 |
| 2011/0264127 A1 | 10/2011 | Mauch et al. | |
| 2011/0264128 A1 | 10/2011 | Mauch et al. | |
| 2012/0289987 A1 | 11/2012 | Wilson et al. | |
| 2013/0066346 A1 | 3/2013 | Pigott et al. | |
| 2013/0103070 A1 | 4/2013 | Kugler et al. | |
| 2013/0116715 A1 | 5/2013 | Weber | |
| 2013/0172883 A1 | 7/2013 | Lopes et al. | |
| 2013/0216114 A1 | 8/2013 | Courtney et al. | |
| 2013/0317534 A1 | 11/2013 | Zhou et al. | |
| 2014/0180222 A1 * | 6/2014 | Flaherty et al. | A61B 17/3207 |

(56) References Cited

U.S. PATENT DOCUMENTS

| | | |
|---|---|---|
| 2015/0057566 A1 | 2/2015 | Vetter et al. |
| 2015/0112188 A1* | 4/2015 | Stigall et al. ........ A61B 17/064 |
| 2016/0081656 A1 | 3/2016 | Abraham |
| 2016/0184525 A1* | 6/2016 | Fech et al. ......... A61B 17/3203 |
| 2016/0374714 A1 | 12/2016 | Majercak et al. |
| 2018/0214173 A1 | 8/2018 | Wilson et al. |
| 2018/0289441 A1 | 10/2018 | Wilson et al. |
| 2018/0333166 A1 | 11/2018 | Wilson et al. |
| 2018/0361118 A1* | 12/2018 | Cully et al. ........ A61B 17/3478 |
| 2019/0021709 A1* | 1/2019 | Gallagher et al. . A61B 17/3203 |
| 2019/0201070 A1* | 7/2019 | Fischell et al. ... A61M 25/0084 |
| 2019/0314620 A1 | 10/2019 | Chang et al. |
| 2020/0000525 A1* | 1/2020 | Stigall et al. ..... A61M 25/0084 |
| 2020/0275975 A1 | 9/2020 | Chen |
| 2020/0337726 A1* | 10/2020 | Wilson ............ A61B 17/320016 |
| 2021/0060305 A1* | 3/2021 | Amin et al. ........ A61M 25/007 |
| 2024/0156491 A1 | 5/2024 | Wilson et al. |
| 2024/0164849 A1 | 5/2024 | Wilson et al. |
| 2024/0216006 A1 | 7/2024 | Wilson et al. |

FOREIGN PATENT DOCUMENTS

| | | |
|---|---|---|
| CN | 1907243 A | 2/2007 |
| CN | 1957861 A | 5/2007 |
| JP | 2002514111 A | 5/2002 |
| JP | 2003033357 A | 2/2003 |
| JP | 2003267160 A | 9/2003 |
| JP | 2009165822 A | 7/2009 |
| JP | 2009183516 A | 8/2009 |
| RU | 2108751 C1 | 4/1998 |
| RU | 2160057 C2 | 10/2000 |
| WO | 1999000059 A1 | 1/1999 |
| WO | 2008063621 A2 | 5/2008 |
| WO | 2010074853 A1 | 7/2010 |
| WO | 2011106735 A1 | 9/2011 |
| WO | 2012030587 A1 | 3/2012 |
| WO | 2012145444 A2 | 10/2012 |
| WO | 2013119849 A1 | 8/2013 |
| WO | 2013159066 A1 | 10/2013 |
| WO | 2014110460 A1 | 7/2014 |
| WO | 2015077515 A1 | 5/2015 |
| WO | 2015148581 A1 | 10/2015 |
| WO | 2016025733 A1 | 2/2016 |
| WO | 2017210656 A1 | 12/2017 |
| WO | 2022016101 A2 | 1/2022 |

OTHER PUBLICATIONS

Lugli, M., et al., Neovalve construction in the deep venous incompetence. J. Vasc. Surg., Jan. 2009, 49(1), 156-62.

Maleti, O., "Neovalve construction in postthrombotic syndrome," J. Vaso. Surg., vol. 34, No. 4, 6 pages.

International Search Report and Written Opinion dated Jan. 10, 2022; International Application No. PCT/US2021/042049; 25 pages.

International Search Report and Written Opinion dated Nov. 23, 2023; International Application No. PCT/US2023/020489; 19 pages.

* cited by examiner

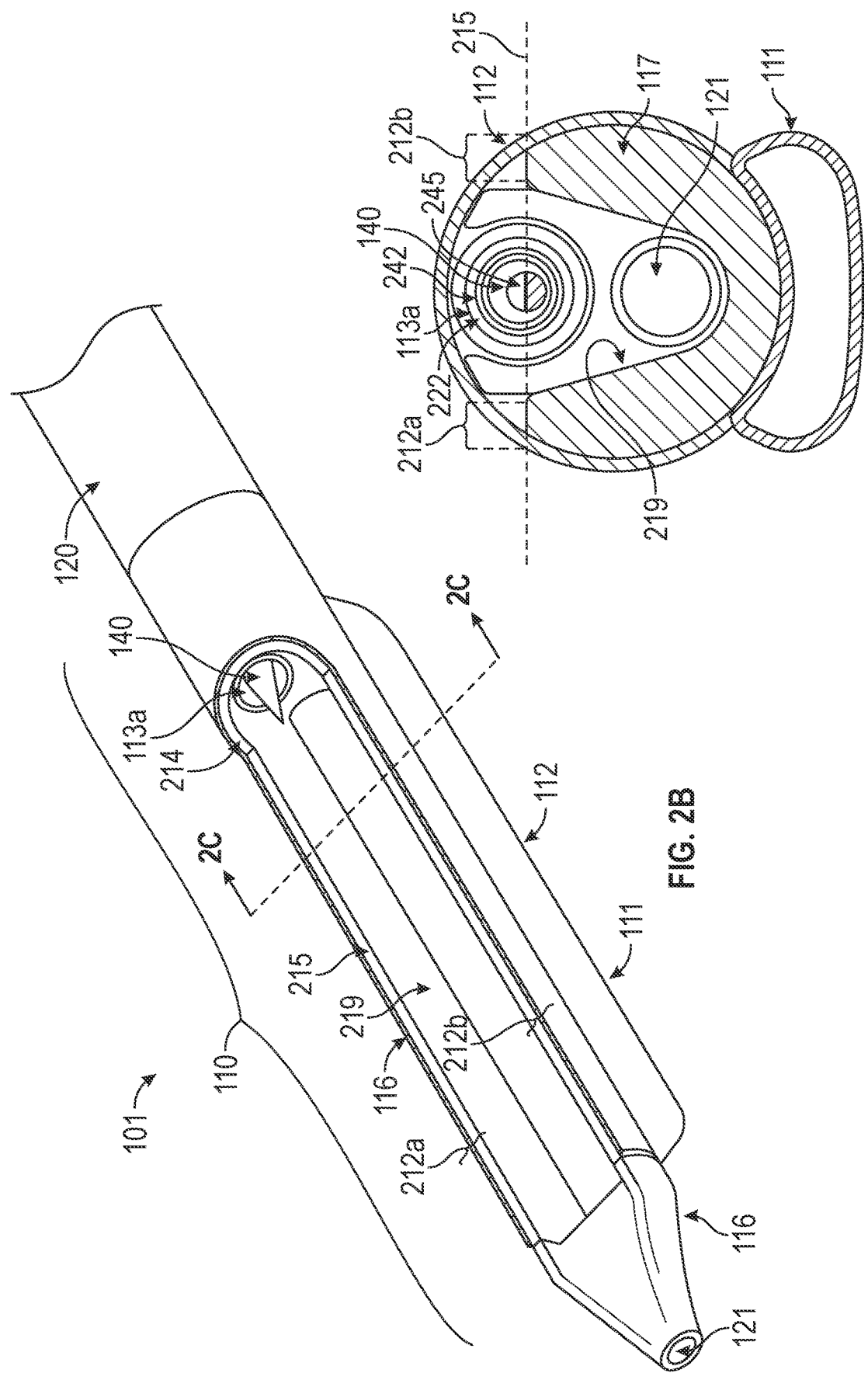

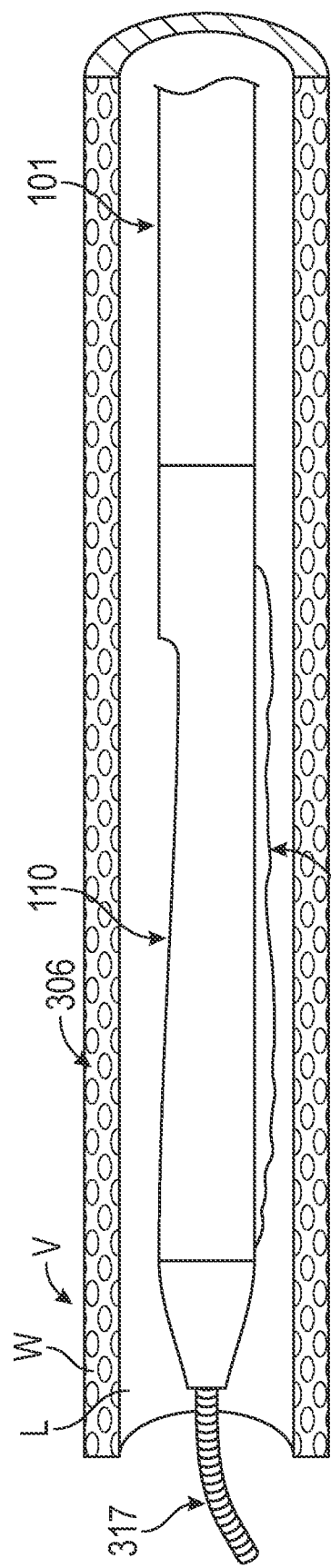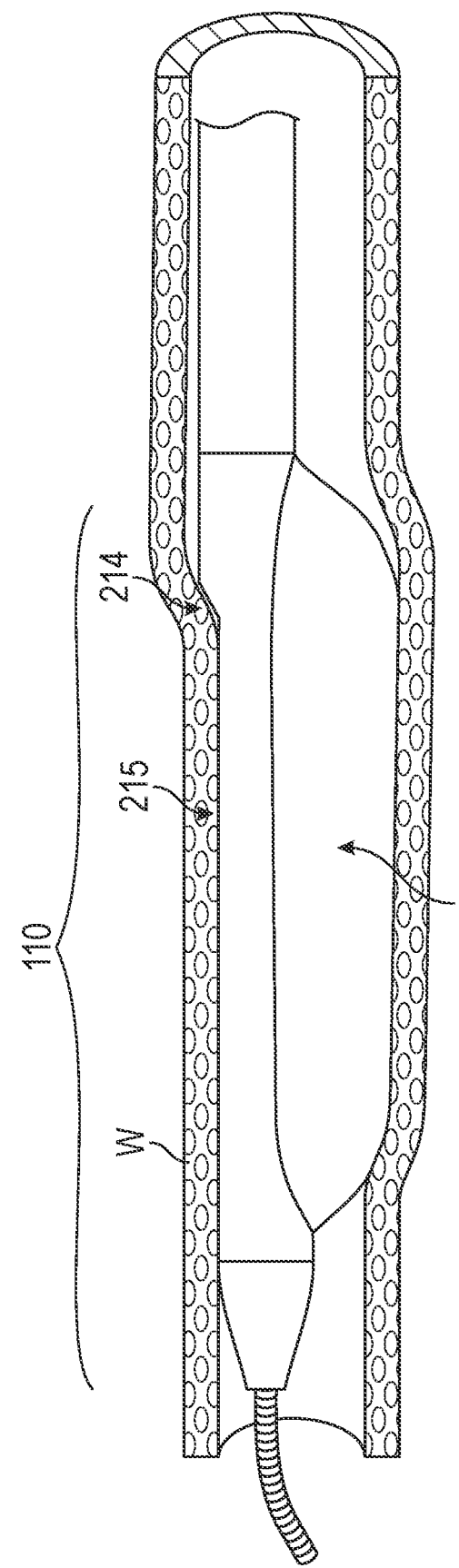
FIG. 3A
FIG. 3B

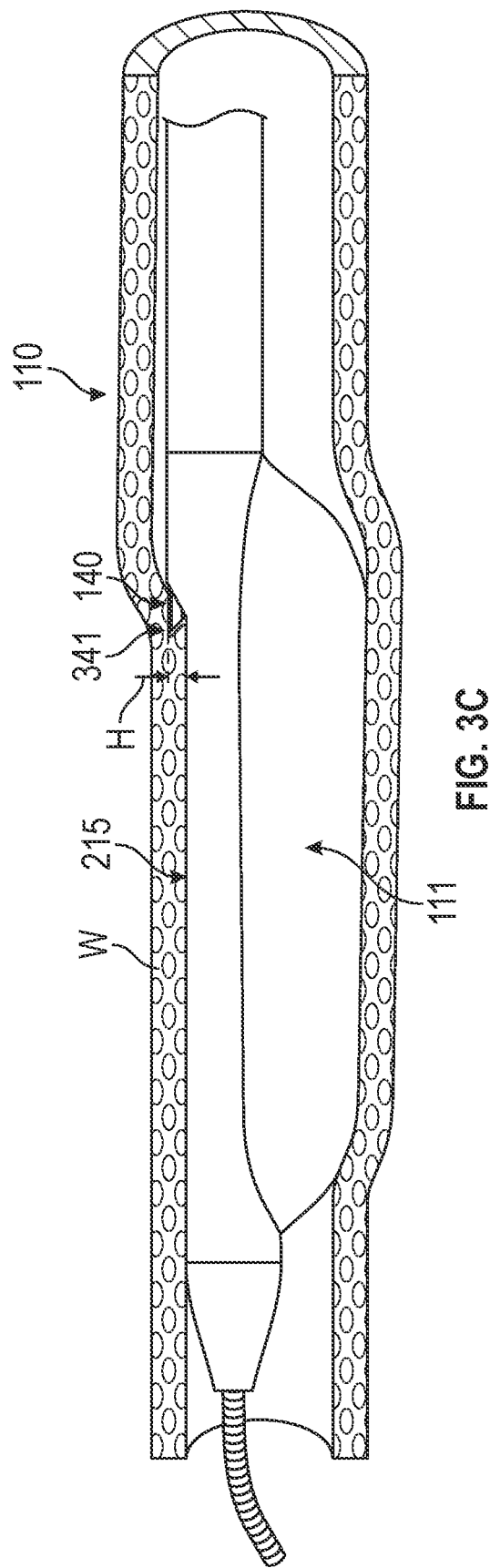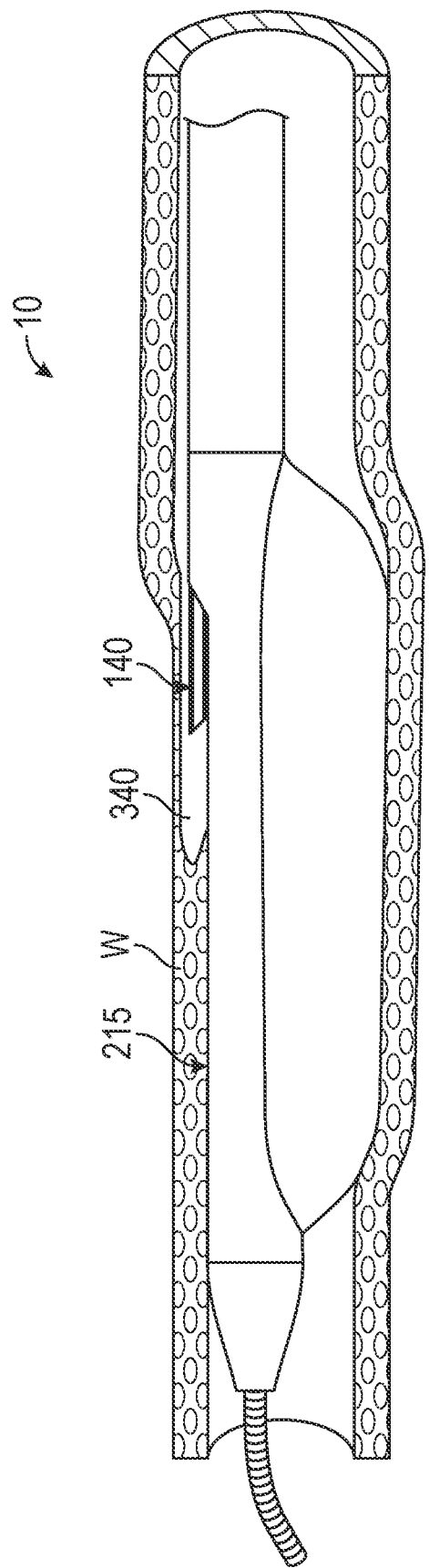
FIG. 3C
FIG. 3D

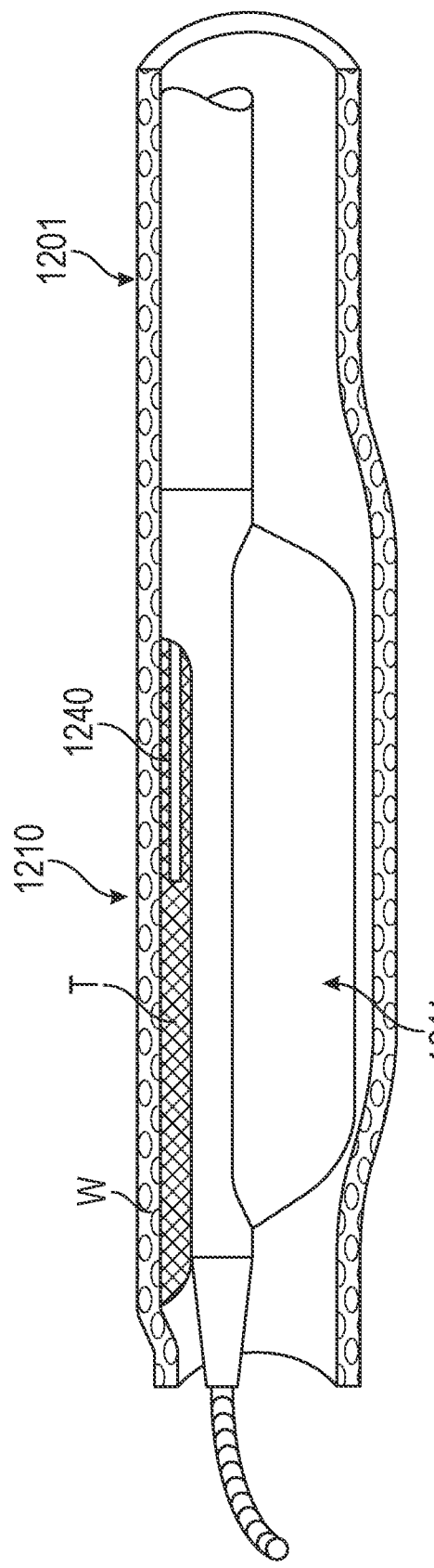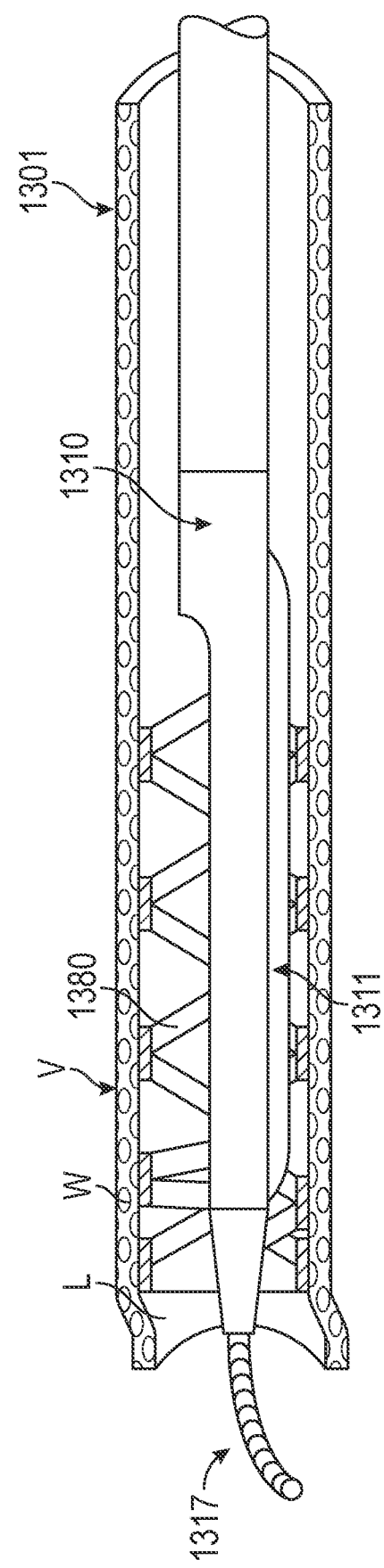

INTRAVASCULAR DEVICES AND METHODS FOR DELIVERY OF FLUIDS AND THERAPEUTIC AGENTS INTO BLOOD VESSEL WALLS AND INTRAVASCULAR STRUCTURES

CROSS-REFERENCE TO RELATED APPLICATIONS

This application claims priority to U.S. Provisional Patent Application No. 63/052,900, filed on Jul. 16, 2020, U.S. Provisional Patent Application No. 63/061,108, filed Aug. 4, 2020, and U.S. Provisional Patent Application No. 63/167,633, filed on Mar. 29, 2021, the entireties of which are incorporated herein by reference.

TECHNICAL FIELD

The present technology generally relates to intravascular catheter systems, and more particularly to intravascular catheter systems for delivery of therapeutic agents, diagnostic agents, and/or other substances into the tissue and wall layers of blood vessels and other body conduits.

BACKGROUND

Some vascular diseases and clinical conditions can benefit from the delivery of therapeutic drugs, or other agents, into and/or around a blood vessel wall or other body conduit. For example, local drug delivery catheters and implants have been used to deliver anti-restenosis drugs to an inner tissue surface of a blood vessel to prevent or reduce the severity of restenosis after a balloon angioplasty or stent procedure in the blood vessel. Drug delivery catheters include drug-coated balloon catheters, balloon catheters with porous walls or porous outer channels, or double balloon catheters with a porous shaft for drug delivery in between the two balloons. However, there are significant obstacles encountered with these types of devices. For example, the drug delivery catheters must be able to deliver adequate quantities of a drug to the vessel wall without either injuring the wall or compromising flow. Other technologies include catheters with needles that infuse drug into the adventitial space of a vessel wall. An example of such a device is the Bullfrog Catheter (Mercator Medsystems, Emeryville, CA) that includes a single needle for drug delivery directed radially outward from the catheter through the vessel wall and into the perivascular space when the balloon is inflated. Another example is the Peregrine System Infusion Catheter (Ablative Solutions, San Jose, CA) which is also designed for needle puncture and infusion into the perivascular space of a blood vessel. The Peregrine System has three needles and relies on a pre-shaped spring structure of the needle elements to direct the needles completely through the vessel wall. These devices, as well as other perivalvular space drug delivery systems, puncture through all layers of the vessel wall and are thus limited to delivering drugs to the perivascular space at discreet sites.

Intravascular stents with drug-eluting capabilities, including metallic stents with drug-impregnated coatings or drug-impregnated polymer stents, have also been developed for local drug delivery to reduce the restenosis or re-occlusion rate after implantation of the stent. These devices are used when stent implantation is the primary therapy for treatment of vessel stenosis, but suffer from late thrombosis due to delayed or impaired healing of the endothelium around the stent caused by the drug and/or the polymer coating. Additionally, these devices are limited to procedures that already involve stent implantation.

Another obstacle for delivering therapeutic drugs is imposed by biological reactions to the delivery of the therapeutic drugs. For example, after-effects can include a deep vein thrombosis (DVT) event, such as venous wall thickening and scarring leading to impaired flow and/or failure of native venous valves. It is expected that local delivery of anti-inflammatory agents into veins may counter the after-effects of a deep vein thrombosis (DVT) event, including venous wall thickening and scarring leading to impaired flow and/or failure of native venous valves.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure. Reference numbers/indicators are used consistently throughout the drawings and description for ease in referring to items having similar structures, features, and/or functions. Identical reference numbers/indicators are not indicative that the items are identical.

FIGS. 2A and 2B are an enlarged cross-sectional side view and an enlarged isometric view, respectively, of a distal portion of the infusion device of FIG. 1 configured in accordance with some embodiments of the present technology.

FIG. 2C is a cross-sectional view of the distal portion of the infusion device of FIG. 2B in accordance with some embodiments of the present technology.

FIGS. 3A-3E are side views of the distal portion of the infusion device of FIG. 1 during various steps of an infusion procedure in accordance with some embodiments of the present technology.

FIGS. 12A-12C are side views of a distal portion of an infusion device during various steps of an infusion procedure in accordance with some embodiments of the present technology.

FIGS. 13A-13C are side views of a distal portion of an infusion device during various steps of an infusion accordance with further embodiments of the present technology.

DETAILED DESCRIPTION

Figure 1:
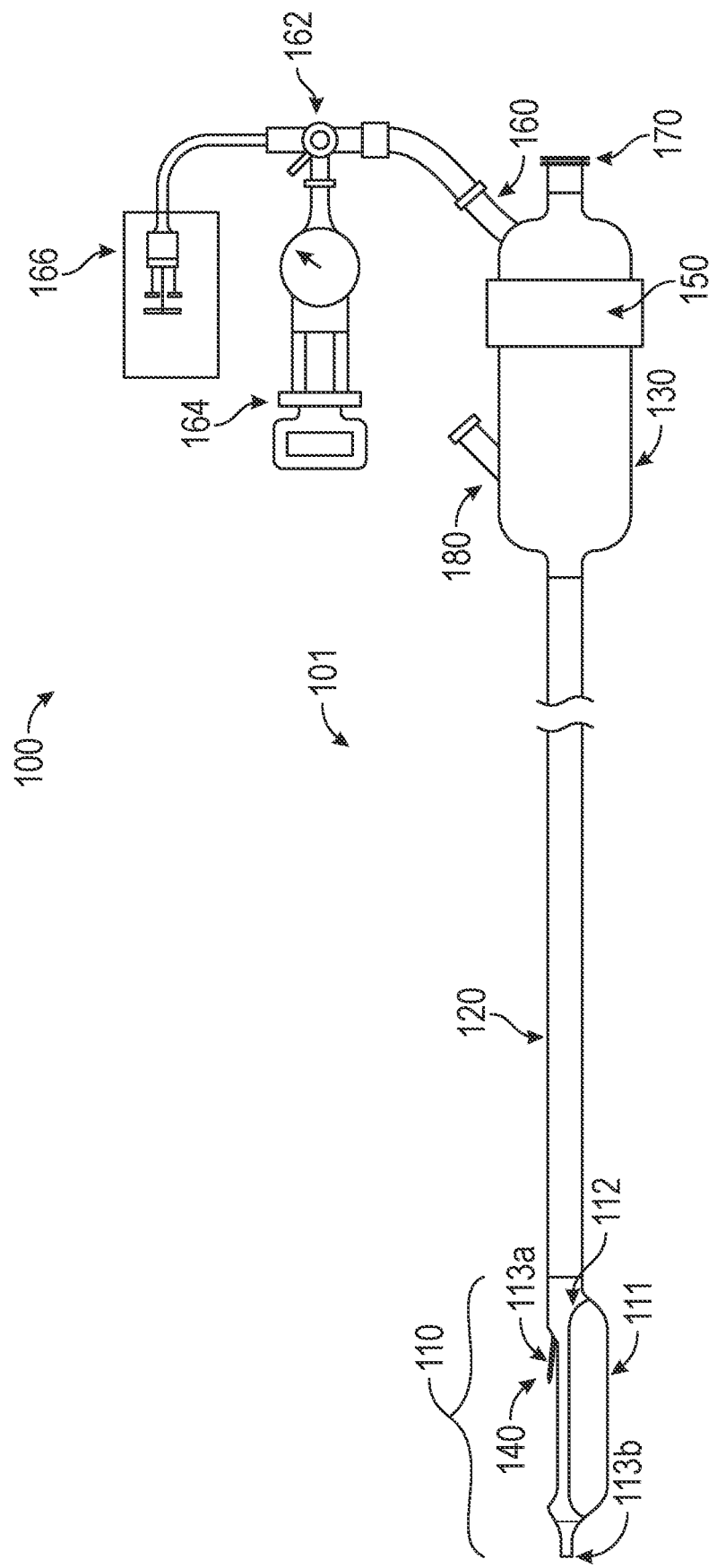
FIG. 1 illustrates a system including an infusion device configured in accordance with some embodiments of the present technology.

The present technology generally relates to medical systems, devices and methods for delivery of drugs, other therapeutic agents, diagnostic agents, and/or other fluids or substances (collectively referred to as "infusates") into the tissue and/or wall layers of various body conduits and/or a space adjacent to the body conduits (e.g., perivascular space). Some embodiments of the present technology provide the delivery of the infusates into a space created between the outer and inner boundaries of a blood vessel wall (e.g., the medial layer of the vessel wall and/or to the adventitial layer of the vessel wall, sometimes also referred to as an intramural space) and/or into the perivascular space outside the vessel wall. Some embodiments of the present technology provide the delivery of the infusates into intravascular tissue or other anatomical structures (e.g., atherosclerotic plaque, fibrous tissue, thrombus, other stenotic tissue, and/or other structures/tissue within the vessel), between the intravascular tissue/structure and the natural inner surface of the vessel wall, and/or between an intravascular implant (e.g., a stent, graft, or stent graft) and the inner surface of the vessel wall. Unlike current methods of local drug delivery, the delivery of the infusates into a wall layer (e.g., intramural space) or other anatomical structure is expected to retain the infusates in tissue layers rather than being washed out if delivered superficially to the inner surface, into a wall layer (intramural) or other anatomical structure. Further, the infusate delivery disclosed herein is more targeted to the vessel wall than current perivascular infusion devices.

The term "intramural," which refers to a location within the layers of vessel wall tissue between the innermost and outermost surfaces of a vessel wall, is used frequently throughout the specification to refer to devices, systems, and locations of drug delivery. However, the "intramural" systems, devices, and methods described herein can additionally, or alternatively, be used to deliver infusates to other in a similar manner and using similar mechanisms as described herein with respect to intramural fluid/agent delivery. For example, the intramural systems, devices, and methods described herein can additionally, or alternatively, be used to deliver infusates into the perivascular space just beyond the outer surface of the vessel wall, other intravascular tissue, anatomical structures, a space between intravascular tissue and the natural inner surface (also referred to as an inner layer) of the vessel wall, an intravascular implant and/or other internally positioned devices, and/or a space between an intravascular implant (or other device) and the inner surface of a vessel.

The term "tissue," as used herein, can include muscle, epithelial, connective and nervous tissue. Further, when discussed with respect to the structures through which the devices herein penetrate and/or deliver infusates, "tissue" can also refer to atherosclerotic plaque, fibrous tissue, thrombus, other stenotic tissue, and/or other structures within or surrounding a vessel.

Infusate delivery systems (sometimes referred to herein as "systems") disclosed herein include devices for accessing a layer of a vessel wall at one or more sites in a section of a blood vessel (e.g., an artery or vein wall) and a means for infusing infusates into the accessed vessel wall layer and/or the perivascular space. The systems disclosed herein can also include variations in the number of puncture sites per device, controls of the perfusion parameters (e.g., flow rate or pressure), control of the thickness and length of the vessel layer accessed, and/or control of other functional parameters associated with hydrodissection, infusate delivery, and/or vessel layer access. In some embodiments, the systems include a means to provide intravascular imaging, such as an imaging catheter with an imaging element to provide an image of the treatment site. The imaging catheter can be an intravascular ultrasound ("IVUS") catheter that captures ultrasound images from within the vessel and/or any other suitable imaging device. The devices disclosed herein can deliver the infusates into an intramural space within the layers of a blood vessel wall and/or perivascular space. The intramural and/or perivascular delivery is expected to increase a drug retention period at the target site, reduce the distance from the target site to the endothelial layer (thereby reducing the distance an agent must travel, disperse, be directed, etc. once delivered), and provide the devices disclosed herein with a wide range of infusion pressure, flow rate, and volume when delivering infusates.

Specific details of several embodiments of the technology are described below with reference to FIGS. 1-15C. Although many of the embodiments are described below with respect to systems and methods for delivering infusates within layers of blood vessels (e.g., between the outer and inner boundaries of a vessel wall), between intravascular tissue and the natural inner layer/surface of the vessel, and/or to the perivascular space, other applications and other embodiments in addition to those described herein are within the scope of the technology. For example, the present technology may be used to deliver infusates within layers of tissue at other target sites, such as the trachea, the esophagus, the intestines, and/or other body conduits. Further, the present technology can be utilized to penetrate and/or manipulate tissue and advance along a planar region within the tissue for reasons other than agent infusion (e.g., separating tissue layers, creating pockets between tissue layers, and/or any other suitable purpose). Additionally, some embodiments of the present technology can have different configurations, components, or procedures than those described herein. Further, several of the features of the embodiments shown in FIGS. 1-15C can be combined with one another and/or omitted in some embodiments of the present technology. A person of ordinary skill in the art, therefore, will understand that the technology can have other embodiments with additional elements, or the technology can have other embodiments without several of the features shown and described below with reference to FIGS. 1-15C.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

With regard to the terms "distal" and "proximal" within this description, unless otherwise specified, the terms can reference a relative position of the portions of a catheter subsystem with reference to an operator and/or a location in the vasculature. Also, as used herein, the designations "rearward," "forward," "upward," "downward," etc., are not meant to limit the referenced component to use in a specific orientation. It will be appreciated that such designations refer to the orientation of the referenced component as illustrated in the Figures and that the systems of the present technology can be used in any orientation suitable to the user.

FIG. 1 illustrates a drug delivery system 100 ("system 100") including an infusion device 101 (also referred to herein as "device 101") configured in accordance with some embodiments of the present technology. The device 101 includes a catheter shaft 120 (also referred to herein as a "catheter device"), a distal portion 110 at a distal end region of the catheter shaft 120 (or defined by the distal end region of the catheter shaft 120), and a handle 130 (also referred to as a "handle assembly") at a proximal portion of the catheter shaft 120. The device also includes a tissue manipulation device 140 (also referred to herein as a "needle" and/or a "tissue penetrating component") that extends through a lumen of the catheter shaft 120. In the illustrated embodiment, the distal portion 110 includes a balloon 111 (also referred to as an "expandable component" or an "apposition member"), a housing 112 with transition surface and an offset surface (also referred to as a "support surface"), and at least one exit port (identified individually as a first exit port 113a and a second exit port 113b; referred to collectively as "exit ports 113"). The tissue manipulation device 140 can extend through the first exit port 113a to puncture and/or otherwise manipulate adjacent tissue. The housing 112 can be sufficiently rigid such that the distal portion 110 generally maintains its shape when pressed against tissue via expansion of the opposing balloon 111. The handle 130 can include actuators (e.g., an actuating component 150, discussed in more detail below) and/or other mechanisms to control the components of the device 101 and/or to fluidly connect any of the components of the device 101 to external components.

Figure 2A:
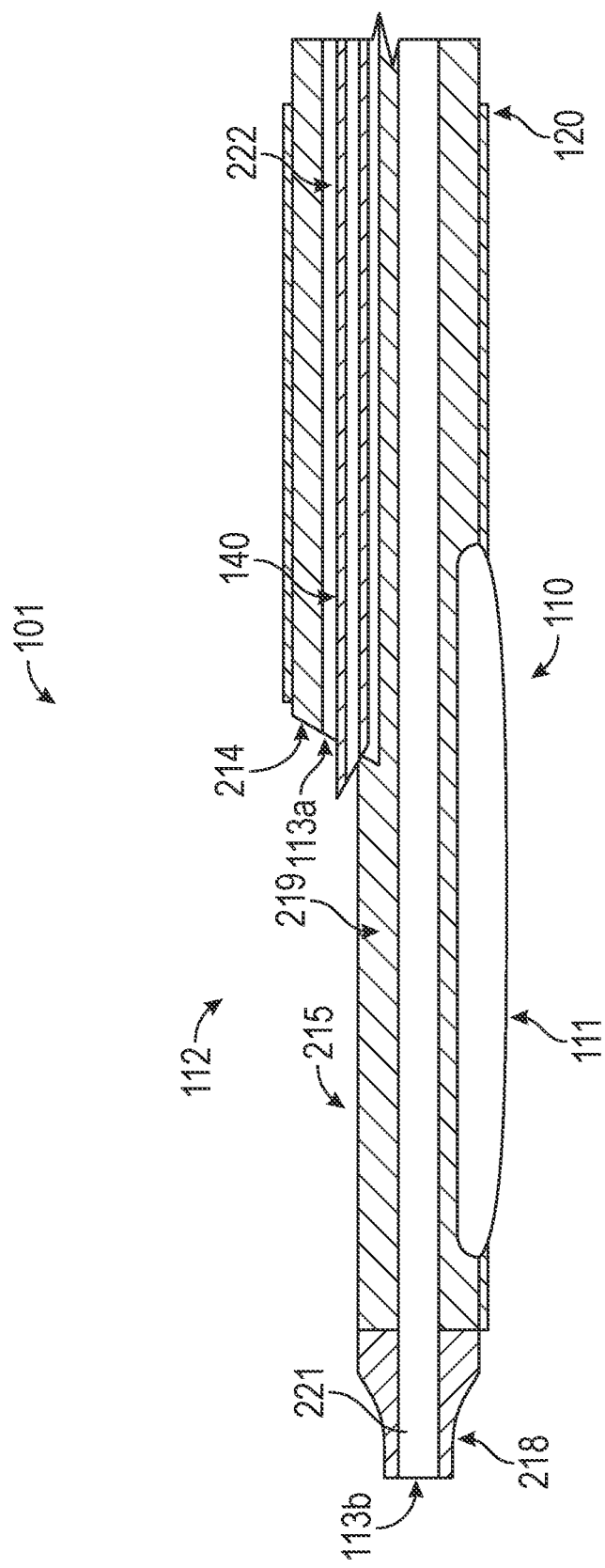

FIGS. 2A-2C are various enlarged views of the distal portion 110 of the device 101 of FIG. 1 in accordance with some embodiments of the present technology. In particular, FIGS. 2A and 2B are an enlarged cross-sectional side and enlarged isometric view, respectively, of the distal portion 110 of the device 101, and FIG. 2C is an enlarged cross-sectional view of the distal portion 110 taken along the line 2C-2C illustrated in FIG. 2B. In the illustrated embodiment, the distal portion 110 is constructed of a metal housing 112 (comprising a tube with a cut-away portion on the distal end) and an insert 116. The metal tubular housing 112 provides the rigid structure to the distal portion 110.

As best illustrated in FIG. 2A, a number of lumens extend from the handle 130 (FIG. 1), through the catheter shaft 120 and terminate at various points along the distal portion. For example, a guidewire lumen 221 extends from terminates at the second exit port 113b at a distalmost end of the distal portion 110; a needle lumen 222 terminates at the first exit port 113a proximal to the distalmost end; and one or more balloon inflation lumens (not shown in cross-section) terminate inside the balloon 111.

As discussed in more detail below, the guidewire lumen 221 allows a guidewire and/or an imaging device to move within the length of the device and through the distal portion 110 of the device. For example, a guidewire can extend through the handle 130, the catheter shaft 120 via guidewire lumen 221 and out of the second exit port 113b to guide the distal portion 110 into position adjacent a target site. Once in position, the guidewire can be retracted, and an imaging component (sometimes referred to as a "visualization device"), for example an IVUS catheter, can be advanced through the guidewire lumen 221 to a position within the distal portion 110 proximal to the distalmost end and/or out of the second exit port 113b. The balloon lumens allow an inflation device (not shown) to be fluidly connected to the balloon 111 to inflate and/or deflate the balloon 111, as desired, during a procedure. In various embodiments, the inflation device can be carried by and/or fluidly coupled to the handle 130 (FIG. 1, discussed in more detail below).

The needle 140 is slidably positioned in the needle lumen 222 and can extend through the catheter shaft 120 and exit out of first exit port 113a. During a procedure using the device 101, the needle 140 can retract (e.g., in response to movement of the actuating component 150 on the handle 130 (FIG. 1)) into the needle lumen 222 while the distal portion 110 is positioned adjacent the target site (e.g., a predetermined point in a vessel wall), then advance out of the needle lumen 222 through the first exit port 113a. As the needle 140 advances, the needle 140 can puncture and/or otherwise manipulate tissue at and/or around the target site. As discussed in more detail below, in various embodiments, the needle 140 can include a protective tube 242 and/or a plug 245, each of which are illustrated in FIG. 2C. As illustrated, the protective tube 242 (also referred to herein as the "tube," the "tapered tube," a "sheath," the "tapered sheath," and/or a "protective cover") is positioned coaxially around the needle 140, while the plug 245 is positioned at least partially within an opening of the needle 140. Additional details on various embodiments of the tapered tube 242 are discussed below with respect to FIGS. 4A and 4B, while additional details on various embodiments of the plug 245 are discussed below with respect to FIGS. 6A and 6B.

Referring to FIGS. 2B and 2C, the distal portion includes an offset surface 215 that extends from the first exit port 113a for a specific length. In some embodiments, the offset surface 215 is not a solid flat surface. Instead, in some embodiments (e.g., as illustrated), the offset surface is a plane defined by two rails 212a, 212b on either side of a trough 219 in the central portion of the distal portion 110. For example, the offset surface 215 defined by the two rails 212a, 212b is indicated by a dotted line in FIG. 2C. As further illustrated in FIG. 2C, the first exit port 113a is positioned to sit partially above and partially below the offset surface (e.g., at least partially in plane with the offset surface 215). In some embodiments, the plane of the offset surface 215 is generally parallel to the longitudinal axis of the distal portion 110 and/or the needle lumen 222.

In the illustrated embodiment, the distal portion 110 includes a transition portion 214 (also referred to as a "transition surface") from the outer surface (e.g., from the housing 112) to the offset surface 215. The transition portion 214 can be a ramp that is angled (e.g., sloping upward, at an obtuse angle relative to the offset surface 215, etc.) or perpendicular with respect to the offset surface 215. Together, the outer surface, the transition portion 214, and the offset surface 215 are configured to conform tissue (e.g., a vessel wall layer) in contact with the distal portion 110 to cover at least a portion of the first exit port 113a. Further, in the illustrated embodiment, the balloon 111 is positioned on the opposite side of the distal portion 110 as the offset surface 215. Accordingly, as the balloon 111 inflates, the balloon 111 can push the outer surface, the transition portion 214, and the offset surface 215 against tissue at and/or adjacent the target site. As a result. the pressure from the balloon 111 can cause the tissue to conform against the distal portion 110. The length of the offset surface 215 can determine the length of the vessel wall that can be accessed by the needle 140, and therefore the length of an intramural space that can created and/or dosed with an infusate therein. The length of the offset surface 215 can vary based on one or more intended uses for the device 101. In various embodiments, for example, the length of the offset surface 215 can be between about 5 millimeters (mm) to about 50 mm, or from about 10 mm to about 30 mm. However, in various embodiments, the length of the offset surface 215 can be shorter than 5 mm, or longer than 50 mm. In some embodiments, the balloon 111 is replaced with another suitable expandable element, such as an expanding cage (e.g., FIG. 9), shape memory material, and the like.

Referring back to FIGS. 2A and 2B, the distal portion 110 can also include a distal tapered tip 218 at the distalmost end of the device 101. The distal tapered tip 218 provides an atraumatic leading edge to the device 101 while it is positioned at and/or adjacent the target site (e.g., within the vessel). In some embodiments, the distal tapered tip 218 is constructed from a softer material, such as an elastomer material. In some embodiments, the distal tapered tip 218 is impregnated and/or constructed from a material that is radiopaque such that the distal tapered tip 218 is clearly visible on fluoroscopy.

Figure 3E:
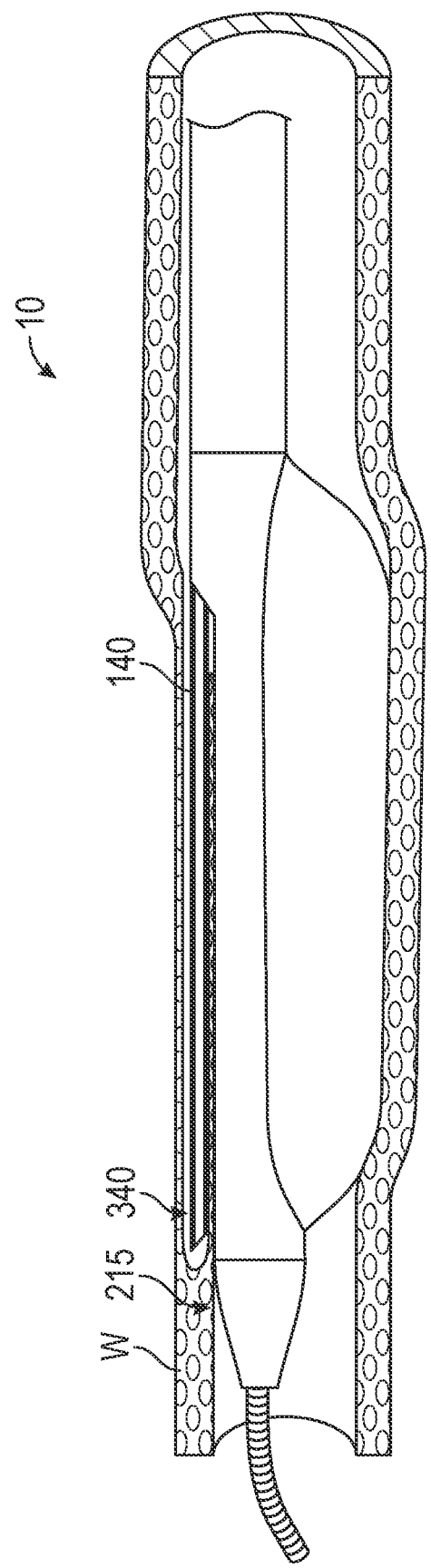

FIGS. 3A-3E are side views of the distal portion 110 of the infusion device 101 during various steps of an infusion procedure in accordance with some embodiments of the present technology. FIG. 3A shows the distal portion 110 of the device 101 being positioned over a guidewire 317 within a vessel V (shown in cross section). The vessel V is defined by a lumen L and a vessel wall W and includes a target site 306. As illustrated in FIG. 3A, the infusion procedure can include positioning distal portion 110 of the device 101 adjacent to the target site 306.

Once the distal portion 110 is positioned, the balloon 111 is inflated, as shown in FIG. 3B. As discussed above, the distal portion 110 has a sufficient rigidity to at least partially conform the vessel wall W to the distal portion 110 when the balloon 111 is inflated (e.g., rather than bending against the vessel wall W). Accordingly, the vessel wall W conforms to the outer surface, the transition portion 214, and the offset surface 215 of the distal portion 110.

FIG. 3C illustrates the needle 140 advancing out of the first exit port 113a to puncture at least a layer of vessel wall W. The height H of a tip 341 of the needle 140 above the offset surface 215 and/or a height of a distal opening of the needle 140 (see FIG. 6, below) determines the thickness of the tissue layer that is accessed. In some embodiments, a fluid is infused through a lumen in the needle 140 at a controlled pressure as the needle 140 is advance. The fluid can assist the needle 140 in piercing, accessing, and/or manipulating the vessel wall W to access the tissue layer.

Once the entirety of the opening in the needle 140 is enclosed in a space S within the vessel wall, as illustrated in FIG. 3D, the fluid flow from the needle 140 can be directed at the adjacent intramural tissue in the vessel wall W. In some embodiments, the hydrostatic pressure generated by the fluid flow separates layers in the vessel wall W in a hydrodissection step and creates an intramural space 340 within the vessel wall W. In some embodiments, the needle 140 is advanced between the layers of the vessel wall W without hydrodissection. Because the offset surface 215 and the section of vessel wall W opposed to the offset surface 215 are at least substantially parallel to the needle lumen 222 (FIG. 1), and because the distal portion 110 conformed the vessel wall W against the offset surface 215, the needle 140 can be advanced in a plane at least substantially parallel to the plane of the offset surface 215 and/or the central longitudinal axis of the distal portion 110. Accordingly, the needle 140 advances along a path at the same depth within the layers of the vessel wall W (e.g., resulting in a generally uniform thickness of the layer of the vessel wall W). As a result, for example as illustrated in FIG. 3E, the needle 140 can advance as long as the full length of the offset surface 215 without repenetrating the vessel wall W (e.g. reentering the vessel V and/or fully penetrating the vessel wall W). As further illustrated in FIG. 3E, the offset surface 215 can help support and the vessel wall W as the needle 140 advances.

Figure 4A:
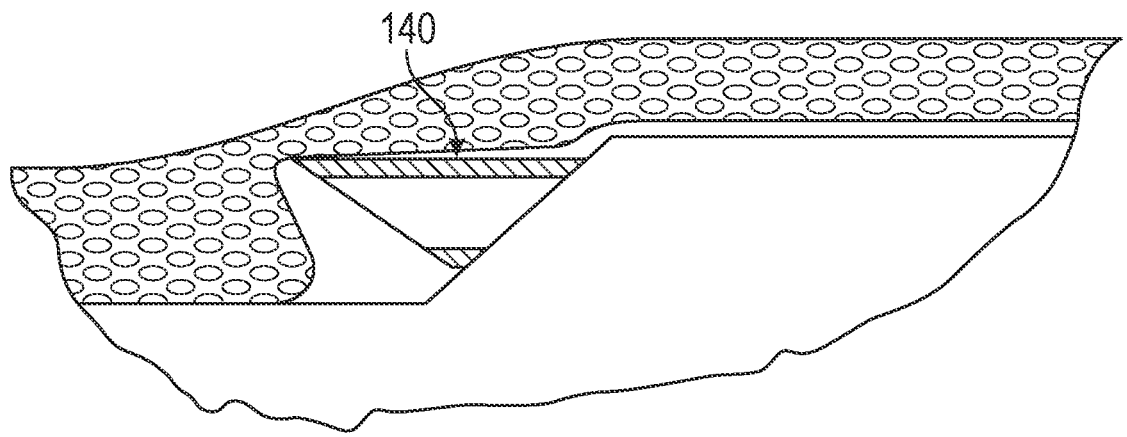
FIGS. 4A and 4B are cross-sectional side views of a tissue manipulation component of an infusion device in accordance with some embodiments of the present technology.
Figure 4B:
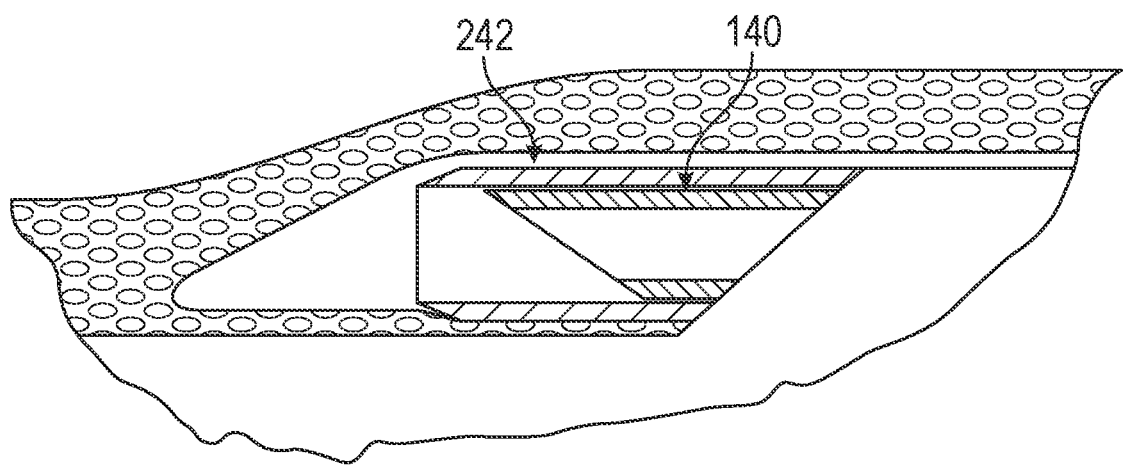

As introduced above, in some embodiments, a protective tube is positioned coaxially around the needle 140. The purpose of the protective tube is to cover the point of the needle 140 after the needle 140 has punctured the vessel wall W to access the intramural wall layers. The tube is expected to protect the accessed layer of the vessel wall W from the needle 140 and, thereby, reduce the likelihood that the point of the needle 140 will unintentionally puncture through the accessed wall layer and/or the vessel wall W as it is advanced forward within the layer of the vessel wall W. FIGS. 4A and 4B, for example, are side cross-sectional views of the needle 140 and the tapered tube 242 penetrating into and advancing within a vessel wall 404 in accordance with some embodiments of the present technology.

In the illustrated embodiment, the tube 242 has a tapered leading edge that defines an atraumatic surface that helps facilitate advancement of the tube 242 and the needle 140 through a puncture point in the vessel wall 404. During a procedure, as seen in FIG. 4A, the needle 140 is advanced until it punctures the vessel wall 404. After the vessel wall 404 is punctured, as shown in FIG. 4B, the tube 242 can then be advanced to cover all, or a portion, of the needle 140. Once the needle 140 is at least partially covered, the tube 242 advances a desired distance into the intramural layer. In some embodiments, the advancement is accomplished (e.g., driven, controlled, monitored, and the like) via actuators (e.g., knobs, levers, mechanical drivers, electrical drivers, and the like), on the handle 130 (FIG. 1).

Figure 5A:
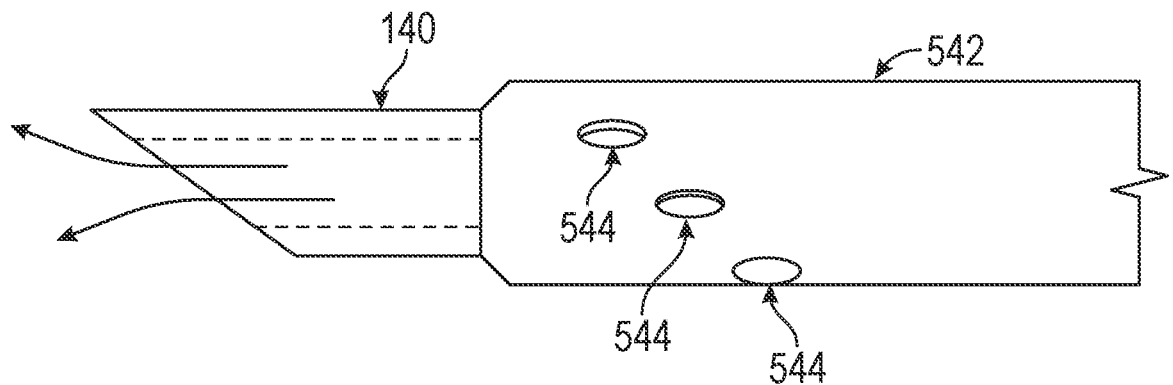
FIGS. 5A and 5B are side views of a tapered sheath with side holes configured in accordance with some embodiments of the present technology.
Figure 5B:
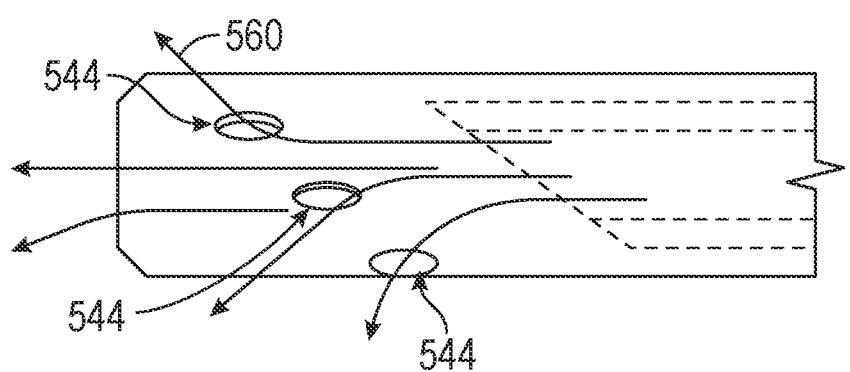

FIGS. 5A and 5B are side views of a tapered tube 542 that includes one or more side holes 544 (three shown) configured in accordance with embodiments of the present technology. In the illustrated embodiment, the side holes 544 are positioned at a distal tip 546 of the tube 542. During a procedure, for example as illustrated in FIG. 5A, the tube 542 is proximal to the needle 140 when the needle is first advanced to puncture the vessel wall. When the needle 140 extends beyond the tube 542, the side holes 544 can be fully and/or partially flush with the exterior surface of the needle 140.

After the needle 140 and tube 542 have advanced into the intramural space, the needle 140 can be pulled back to expose the side holes 544, for example as illustrated in FIG. 5B. As the side holes 544 are exposed, the side holes 544 allow delivery of a fluid 560 (e.g., the infusate and/or a diluted infusate) exiting the needle 140 in both a transverse and longitudinal direction from the tube 542. If the end of the needle 140 is blocked by its position in the tissue (e.g., by a thrombus, atherosclerotic plaque, and/or other structure within or surrounding a vessel), infusion would exit from the side holes only. In various embodiments, the flow pattern can be adjusted by adjusting the shape, size, and distribution of the side holes. For example, in some embodiments, the tube 542 (or the distal tip 546 of the tube 542) is made from a compressible material and/or a shape memory material. Once the needle 140 is retracted, the tube 542 deforms (e.g., compresses) to close or narrow the opening at the distal tip 546. As a result, the deformation further directs flow through the side holes 544 in a transverse direction. In some embodiments, the needle 140 has one or more side holes (not shown) that are blocked when the tube 542 is positioned over the needle 140. Once the needle 140 and tube 542 are in the intramural space, the tube 542 can retract to expose the side hole(s) in the needle 140, allowing the needle 140 to direct the fluid 560 in both the longitudinal and transverse directions (i.e., distally from the device 101 (FIG. 2) and laterally from the needle 140).

Figure 6A:
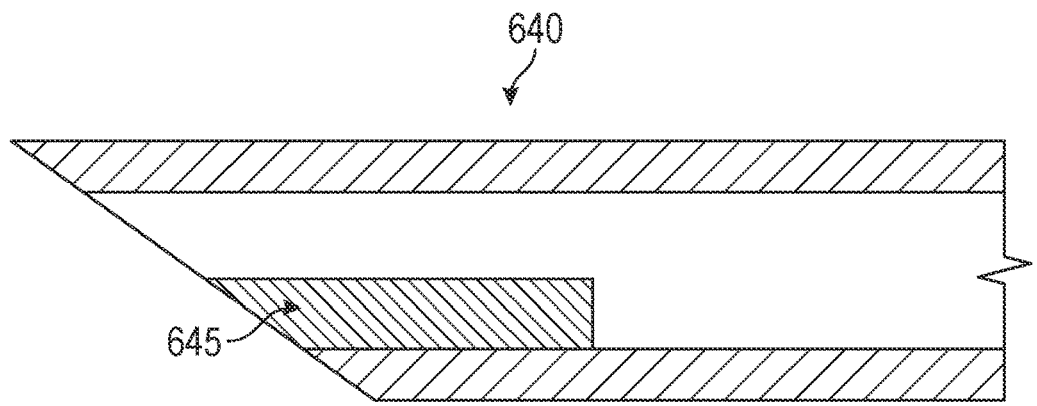
FIGS. 6A and 6B are cross-sectional side and front views, respectively, of a distal end portion of an eccentric needle configured in accordance with some embodiments of the present technology.
Figure 6B:
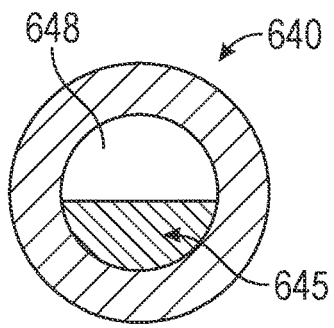

FIGS. 6A and 6B are cross-sectional side and end views, respectively, of a distal end portion of a needle 640 with a partially blocked distal opening 648 (also referred to as "the needle opening 648") in accordance with embodiments of the present technology. As illustrated, the distal opening 648 of the needle 640 is partially blocked by a plug 645 that, in various embodiments, can be a removable, adjustable, or permanent feature of the needle 640. In some embodiments, the plug 645 is made of the same material as the needle 140 (e.g., stainless steel) and is soldered, welded, or otherwise adhered to the inner lumen of the needle 640.

In the illustrated embodiment, the plug 645 is positioned on a lower portion of the distal opening 648, thereby offsetting the distal opening 648 towards the distal-most tip of the needle 640. Said another way, the plug 645 biases the open space of the distal opening 648 at least partially above a central axis needle of the needle 640 (extending along the longitudinal axis of the needle 640). The offset allows the needle opening 648 to be enclosed within a vessel wall before the needle 640 is fully advanced into the vessel wall. That is, while an upper portion of the distal tip of the needle 640 has penetrated a vessel wall (e.g., corresponding to the open space of the distal opening 648), the lower portion (e.g., corresponding to the space of the distal opening 648n blocked by the plug 645) can still be outside and/or engaging the vessel wall. In this position, the plug 645 can contact the vessel wall while the open space of the needle opening 648 is fully within the vessel wall. Further, the plug 645 can create a fluid tight seal with the vessel wall, allowing a dissection fluid (e.g., saline) to flow out of the needle opening 648 to create the intramural space within a thinner layer of the vessel wall (e.g., less that the full thickness of the needle 640). Additionally, or alternatively, the offset of the needle opening 648 allows an infusate to be delivered to the vessel wall close to the inner endothelial layer of the blood vessel while still enclosed in an intramural space for retention. The offset of the needle opening 648 can be advantageous if the vessel wall is very thin, (e.g., for a vein wall with less than 1 mm wall thickness) and a thin layer is required to stay within an intramural space in the vessel wall rather than exiting into the outer adventitial or perivascular space.

Figure 7:
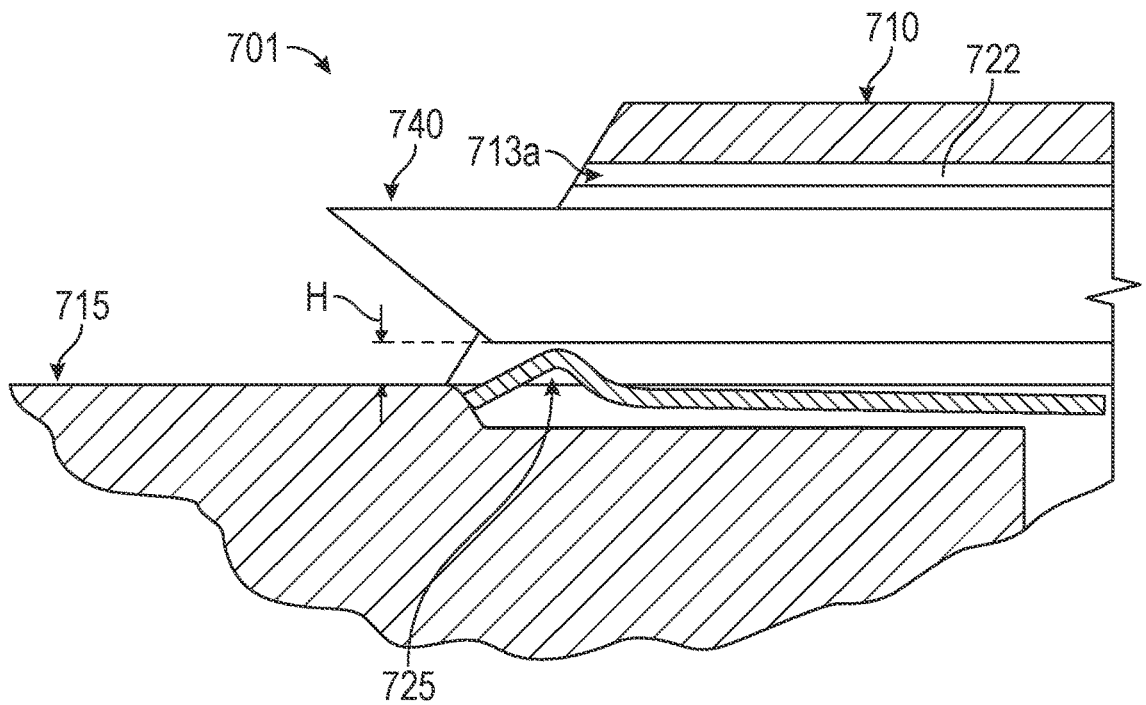
FIG. 7 is an enlarged side view of a distal end portion of an infusion device with an adjustable needle height configured in accordance with some embodiments of the present technology.

In some embodiments, the device 101 includes features to adjust the needle height H. For example, FIG. 7 is an enlarged side view of a distal portion 710 of an infusion device 701 that includes features to adjust the needle height in accordance with some embodiments of the present technology. As illustrated in FIG. 7, the distal portion 710 can include a height adjustment feature 725 in a distal portion of a needle lumen 722. As the needle 740 advances out of the first exit port 713a, the needle 740 is at least partially carried by the height adjustment feature 725, thereby setting the height of the needle 740 above the offset surface 215. The height adjustment feature 725 can be raised or lowered, thereby raising or lowering the height of the needle 740. In various embodiments, the height adjustment feature 725 can be a rod with a ramp at the tip that is pushed or pulled to increase or decrease the height; a strip that bulges out to varying degrees when pushed; and/or an expandable structure (e.g., a balloon, an expandable cage, a shape memory device, and the like) that is expanded to varying degrees.

Figure 14A:
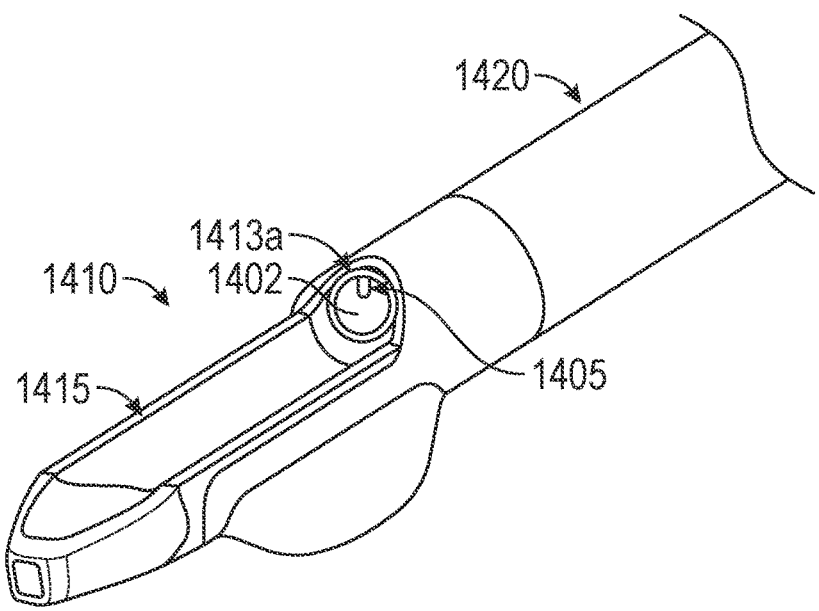
FIGS. 14A-14C are isometric, side, and end views, respectively, of a distal end portion of an infusion device with an adjustable needle height configured in accordance with some embodiments of the present technology.
Figure 14B:
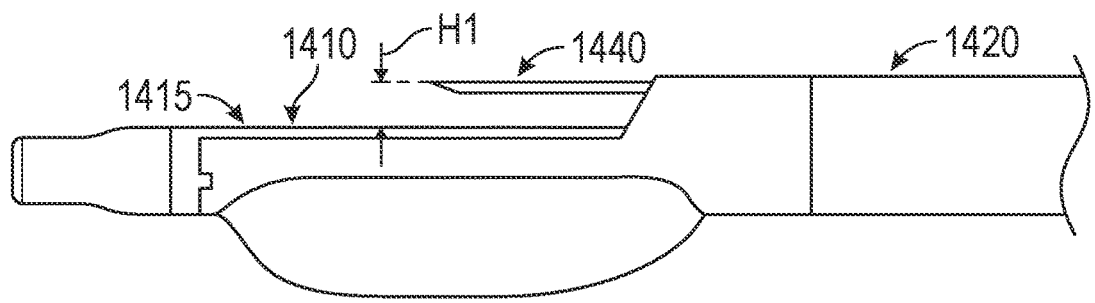

FIGS. 14A-15C illustrate an embodiment of a distal portion 1410 of an infusion device 1401 with adjustable needle height above an offset surface 1415 configured in accordance with some embodiments of the present technology. FIG. 14A is an isometric view of the distal portion 1410 with a needle guide component 1402 (also referred to as "the needle guide 1402" and a "guide component") that terminates at the first exit port 1413a. The needle 1440 (not shown in FIG. 14A for clarity) can be positioned in a track 1405 (e.g., a groove or protrusion) of needle guide 1402. The track 1405 can then position the needle in a specific position with respect to the center of the needle guide 1402. Rotating the needle guide 1402 also rotates the position of the track 1405, and therefore the position of the needle. As a result, the height $H_1$ (FIG. 14B) of the needle moves between a maximum height position ($H_1$) and a minimum height position ($H_2$). In FIGS. 14A and 14B, the needle guide 1402 is configured such that the height of the needle 1440 is at the highest position $H_1$. The needle 1440 is then advanced during use of the device 1401 (e.g., during a procedure) at the highest position $H_1$.

Figure 15A:
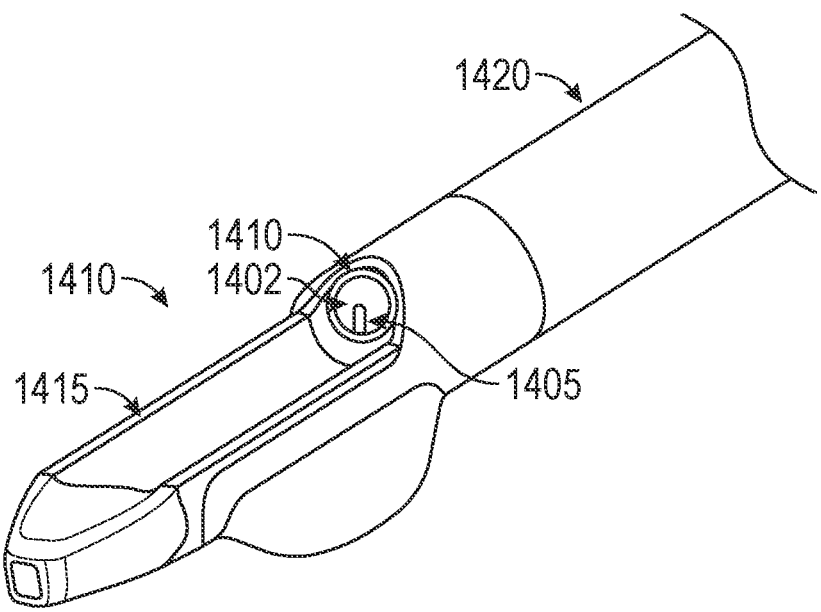
FIGS. 15A-15C are isometric, side, and end views, respectively, of a distal end portion of an infusion device with an adjustable needle height configured in accordance with embodiments some of the present technology.
Figure 15B:
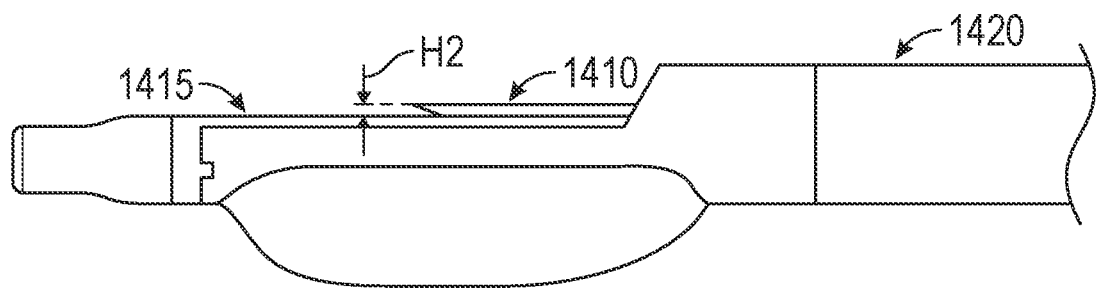
Figure 15C:
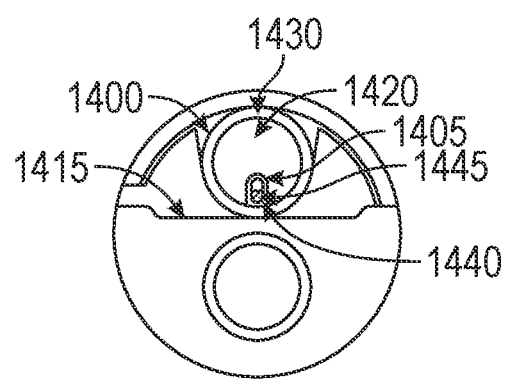

FIGS. 15A-15C illustrate the distal portion 1410 with the needle guide 1402 configured to position the needle at the minimum height position. In this configuration, the needle 1440 (not shown in FIG. 15A) is advanced at the minimum height position $H_2$ during use of the device 1401 (e.g., during a procedure). In some embodiments, the needle guide 1402 can be rotated to any angle between the top and bottom angles shown in FIGS. 14A-14B and 15A-15C, respectively, to set the needle height to any height between the maximum height position $H_1$ and the minimum height position $H_2$.

Figure 14C:
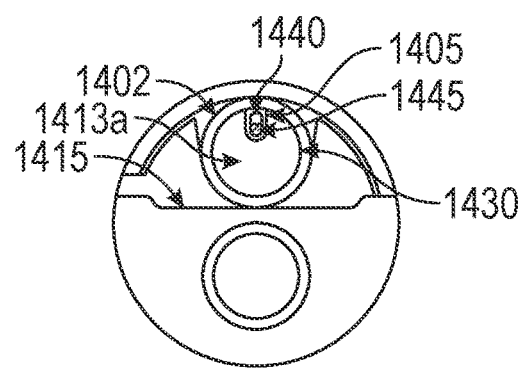

In some embodiments, the needle guide 1402 extends from the first exit port 1413a along the shaft 1420 and is operably coupled to a needle height adjustor (not shown) at the handle 130 (FIG. 1). By rotating, or otherwise manipulating, the needle height actuator, the user can set the needle height at any position at and/or between the maximum height position $H_1$ and the minimum height position $H_2$. The amount of offset of the track 1405 determines the distance between the maximum height position $H_1$ and the minimum height position $H_2$. The maximum height position $H_1$ and the minimum height position $H_2$, respectively, are also at least partially determined by the dimensions of the needle guide 1402, the geometry of the first exit port 1413a, and the offset surface 1415 of distal portion 1410. In some embodiments, the track 1405 extends the entire length of needle guide 1402. In some embodiments, the track 1405 extends only in the distal portion of needle guide 1402. For example, as best seen in FIGS. 14C and 15C, the needle guide 1402 can be formed from a plug 1445 with the track 1405, inserted into the end of a tube 1430. The tube 1430 can extend the length of the shaft 1420 and attach to the needle height actuator of the handle 130 (FIG. 1). The needle can then be positioned within the tube 1430 and exit out of the first exit port 1413a on the track 1405 of the plug 1445.

In various other embodiments, the infusion devices disclosed herein can include various additional (or alternative) features to adjust the height of the needle. For example, the tube 542 (FIG. 5A) can include an inner lumen that is partially offset from a central axis of the tube 542 (or eccentric to the outer surface of the tube 542). In such embodiments, the needle is at least partially carried by the inner lumen, such that rotating the tube 542 has the effect of lowering or raising the needle according to the offset of the inner lumen. In some embodiments, accordingly, the handle 130 (FIG. 1) includes an actuator (e.g., a knob, lever, and the like) that controls the rotation of the tube 542. In various embodiments, device can include features that allow the device to bend slightly upwards and/or downwards at the distal portion and/or at the transition between the catheter shaft and the distal portion. The slight bending can have the effect of varying the height of the needle as it exits the first exit port. In some embodiments, the bending motion is caused and/or controlled by wires or other pulling mechanisms attached to one side of the distal portion and running the length of catheter shaft to an actuator on the handle. The pulling mechanisms are attached to the distal portion on the side corresponding to the desired bend direction (e.g., on the inside of the curve or bend). In some embodiments, the device can include multiple pulling mechanisms, allowing the distal portion to bend in multiple directions. For example, the device can include a first pulling mechanism on a first side (e.g., the bottom) of the distal portion and a second pulling mechanism on a second side (e.g., the top) of the distal portion, allowing the distal portion to bend in first and second directions.

In some embodiments, the user (e.g., a surgeon or other medical care provider) can predetermine a thickness of the intraluminal tissue, vessel wall layer, and/or perivascular space they would like to access and deliver an infusate into, adjust the height of the needle, then puncture the vessel wall. Additionally, or alternatively, the user can perform an infusion in one layer at a first depth (and therefore with a first layer thickness), retract the needle out of the wall, adjust the needle height, then re-puncture to perform an additional infusion at a second layer at a second depth. In some embodiments, the device can access the target site multiple times to perform the infusion at multiple layers with varying depths (e.g., the first and second layers from above). In some embodiments, the user can predetermine two or more target sites in the same vessel (or in varying vessels) and access the multiple target at multiple depths.

In any of the embodiments discussed above, intravascular imaging can help facilitate the infusion procedure. For example, during an infusion procedure, the user can intravascularly image the target site in a vessel before inserting and/or positioning the device 101 (FIG. 1). The user can then use the intravascular images (and any related information) to predetermine the thickness of the vessel wall layer they would like to access and infuse an agent into. Intravascular ultrasound (IVUS) is a common method for intravascular imaging. Various examples of imaging components carried by interveinal catheters are described in U.S. patent application Ser. No. 17/355,456 filed Jun. 23, 2021 and incorporated herein by reference.

Figure 8:
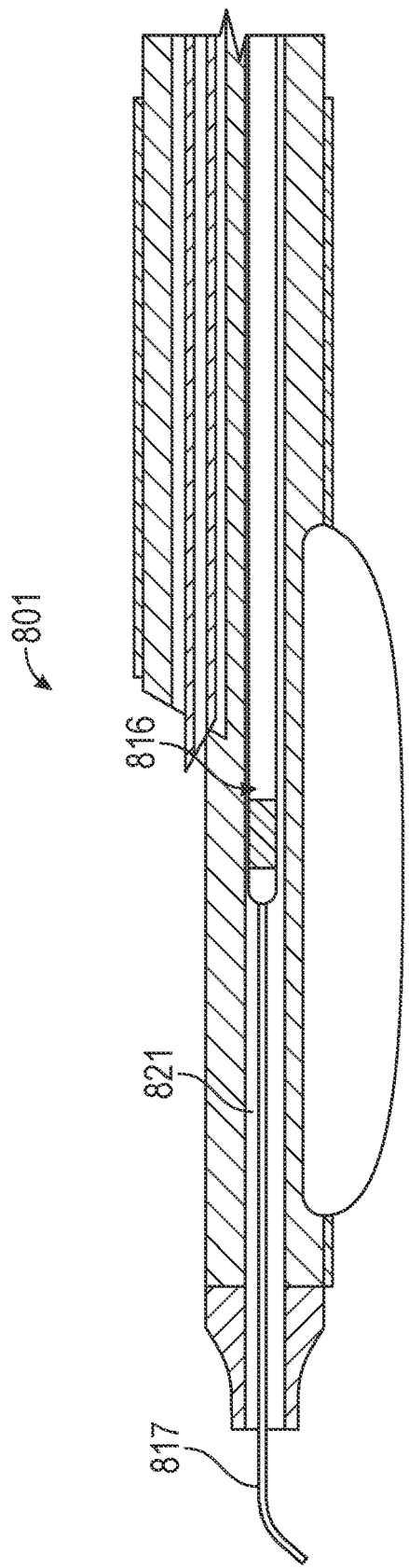
FIG. 8 is a cross-sectional side view of an infusion device with a lumen for a visualization device configured in accordance with some embodiments of the present technology.

FIG. 8 is a side cross-sectional view of an infusion device 801 configured in accordance with some embodiments of the present technology. In the illustrated embodiment, the device 801 includes a guidewire lumen 821 (also referred to as the "lumen" or an "auxiliary component lumen") which is configured to also accommodate an imaging component 816 (e.g., an intravascular imaging catheter) and/or a guidewire 817 therein. For example, during a procedure, a guidewire 817 is advanced to a position adjacent the target site, and the distal portion 810 of the device 801 is first positioned at a target site in a blood vessel over the guidewire 817. Meanwhile, the imaging component 816 can be positioned coaxially around the guidewire 817 to capture images of the vessel. That is, the imaging component 816 can be moveably positioned within the lumen 821 to visualize the needle advancement and infusate delivery steps of the infusion procedure. For example, as the device 801 is moved into position within the vessel, the imaging component 816 can capture intravascular images of the vessel wall adjacent the distal portion 810. The images can allow the user to determine adjustments to the target site and reposition the guidewire 817 (and therefore the end position of the distal portion 810) accordingly, without needing to remove the imaging component 816 to do so.

In some embodiments, once positioned, the guidewire 817 is removed and replaced with the imaging component 816 (e.g., an imaging catheter IC (e.g., including an optional component-specific guidewire)). In some embodiments, the device 801 includes separate lumens for the imaging component 816 and the guidewire 817 (e.g., adjacent to each other and/or spaced apart from on another).

Figure 9:
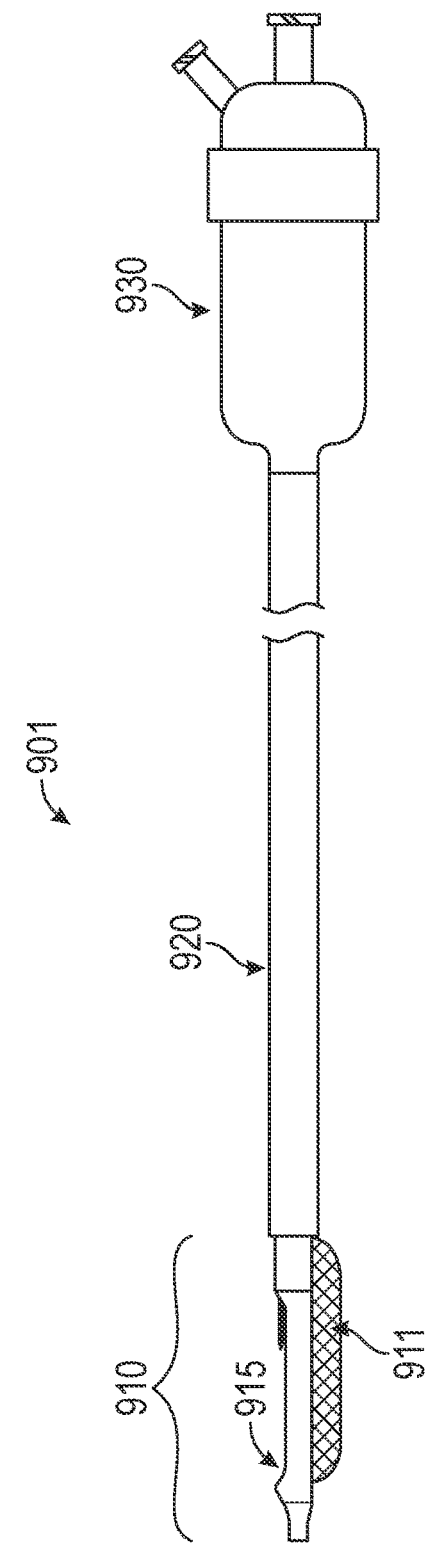
FIG. 9 is a side view of a distal portion of an infusion device with a mechanical expansion element configured in accordance with some embodiments of the present technology.

FIG. 9 is a side view of an infusion device 901 with a mechanical expansion element 911 ("expansion element 911") configured in accordance with some embodiments of the present technology. The infusion device 901 can include features generally similar to those of the infusion devices described above with respect to FIGS. 1-8. For example, the device 901 can include a distal portion 910 with offset surface 915, a catheter shaft 920, and a handle 930. As illustrated in FIG. 9, the expansion element 911 can be carried by the distal portion 910 to enable apposition of the vessel wall against the offset surface 915. In the illustrated embodiment, the expansion element 911 is a braided structure that includes an expandable braid. The expandable braid expands outwardly from the housing of the distal portion 910 when a proximal end of the mechanical expansion element 911 is pushed towards the distal end (e.g., via an actuator carried by the handle 930), thereby shortening the length and expanding the diameter of the expansion element 911. In some embodiments, the actuator includes a push-pull mechanism (e.g., inner and outer activation shafts) operably coupled to the expansion element 911 that, when moved in a distal direction relative to a proximal-most point of the handle 930, pushes the proximal end of the mechanical expansion element 911 toward the distal end of the mechanical expansion element 911 (e.g., to expand the diameter of the expansion element 911); and, when moved proximally, elongates the expansion element 911 (e.g., to contract the diameter of the expansion element 911); or vice versa. The travel distance of the proximal end (e.g., the relative movement between the proximal and distal ends) can determine the amount of expansion of the expansion element 911. Further, the travel distance of the proximal end can be measured and/or indicated on the handle 930 (e.g., an actuator can include indicative marks). In various embodiments, the expansion element 911 can have other structures and/or expansion mechanisms, such as a cut nitinol tube structure with a cut pattern that expands outwards when shortened, various suitable shape memory devices, expandable cages, and the like.

Figure 10:
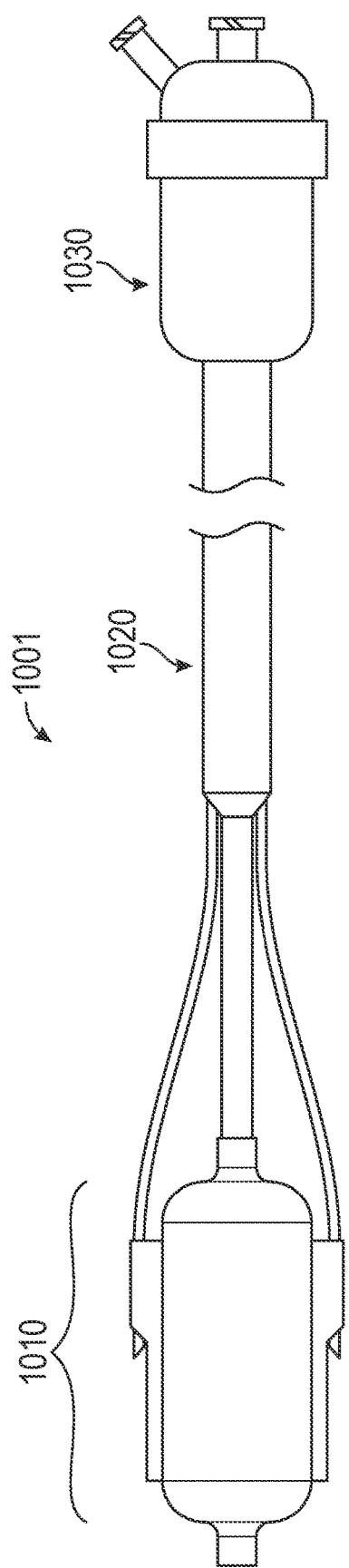
FIG. 10 is a side view of an infusion device with multiple infusion assemblies configured in accordance with some embodiments of the present technology.

In some embodiments, as illustrated in FIG. 10, the infusion device 1001 can include multiple tissue manipulation assemblies that are spaced apart from each other along the distal portion 1010 of the device 1001. The multiple tissue manipulation and infusion assemblies (also referred to as "infusion assemblies" or "manipulation assemblies") allow the device 1001 to manipulate and/or infuse an agent into tissue at more than one target location within a section of vessel without moving the distal portion 1010. The manipulation and/or agent infusion at multiple sites can be performed concurrently (e.g., simultaneously or generally simultaneously) and/or successively without moving the distal portion 1010. As a result, a single procedure can be more efficient than when performed by a device with a single infusion assembly by reducing the time to manipulate and/or infuse an agent in multiple locations and/or more effective by multiplying the infusion sites that can be accessed during one infusion session (e.g., which may have a limited time frame for completion). In the embodiment illustrated in FIG. 10, for example, the infusion assemblies are positioned on opposite sides of the distal portion 1010, allowing the device 1001 to manipulate and/or infuse an agent into both sides of a vessel wall without rotating the distal portion 1010.

Figure 11A:
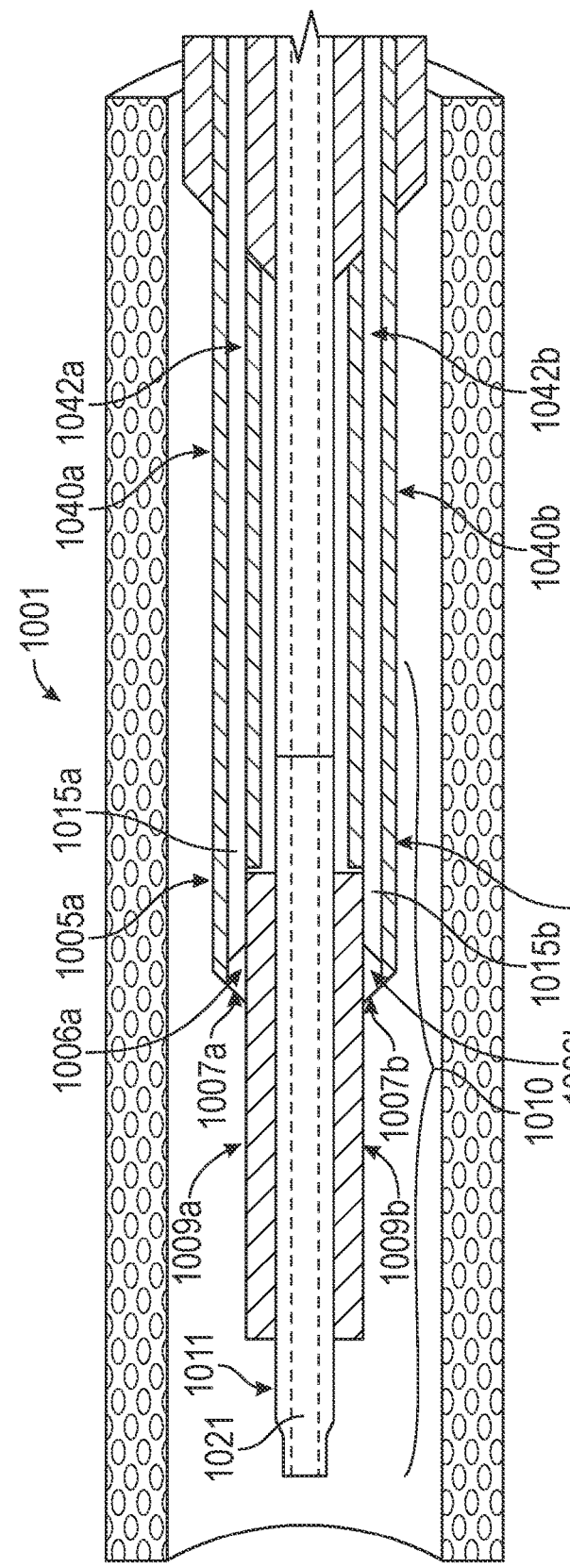
FIGS. 11A-11C are partially cross-sectional side views of the distal portion of the infusion device of FIG. 10 during various steps of a dual-site infusion procedure in accordance with some embodiments of the present technology.
Figure 11B:
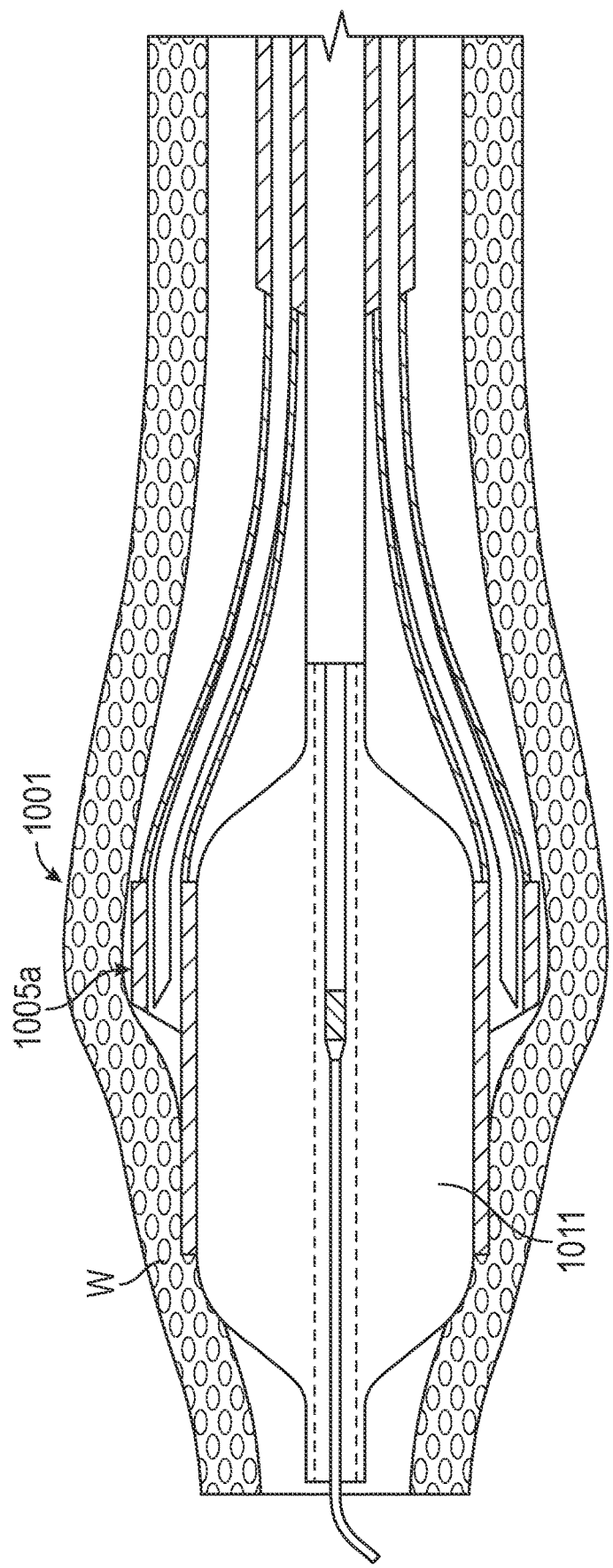
Figure 11C:
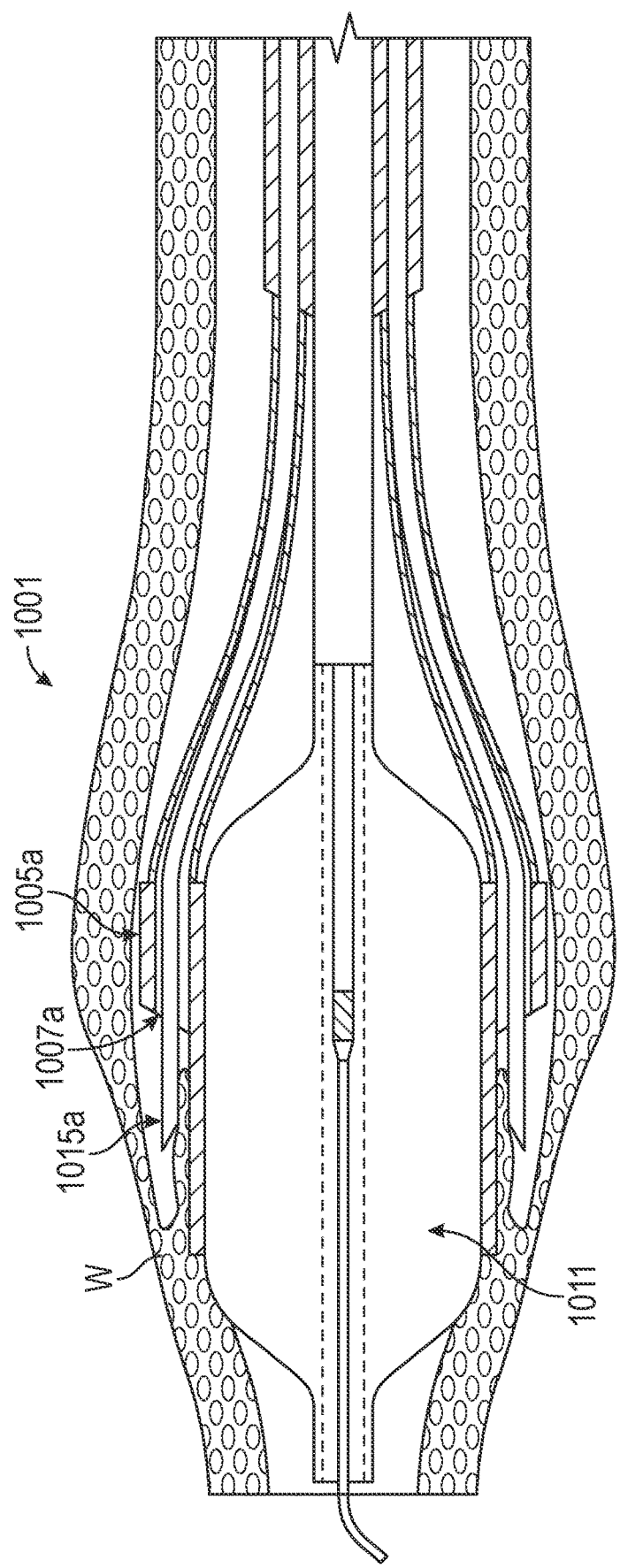

FIGS. 11A-11C are partially cross-sectional side views of the distal portion 1010 of the infusion device 1001 of FIG. 10 during various steps of a dual-site infusion procedure in accordance with some embodiments of the present technology. Referring to FIGS. 10-11C together, the device 1001 includes various features generally similar to the features of the devices described above with respect to FIGS. 1-9, such as the distal portion 1010, a catheter shaft 1020, and a handle 1030. In the illustrated embodiment, the distal portion 1010 includes a balloon 1011 with a central lumen 1021. Not shown in the cross-sectional view of the distal portion 1010 are one or more lumens for balloon inflation (e.g., providing fluid communication with the handle 1030). In various other embodiments, the balloon 1011 can be any other suitable expandable component (e.g., a shape memory device, expandable cage, and the like).

As best illustrated in FIG. 11A, the distal portion 1010 includes rigid offset components 1005a and 1005b (referred to collectively as "the rigid components 1005") attached to opposite sides of balloon 1011. Each of the rigid components 1005 includes a lumen 1006 with a corresponding exit port 1007, an offset surface 1009, and a transition to the offset surface. The rigid components 1005 can be glued or otherwise attached to balloon 1011 in a manner that does not compromise the integrity of the balloon 1011 when inflated (e.g., by weakening the balloon 1011). Guide tubes 1040a and 1040b extend from the proximal end of the rigid components 1005 towards the handle 1030 (FIG. 10). In the illustrated embodiment, the guide tubes 1040a and 1040b extend continuously to the handle 1030 and include two lumens 1042a and 1042b (referred to collectively as "the shaft lumens 1042") within in catheter shaft 1020. Two needles 1015a, 1015b can then extend from the handle 1030, through the shaft lumens 1042 and into (or out of) the rigid components 1005.

FIG. 11A illustrates the device 1001 being positioned in a vessel before the balloon 1011 is uninflated. FIG. 11B illustrates the device 1001 after the balloon 1011 is inflated, bringing the vessel wall W in apposition to the rigid components 1005. FIG. 11C illustrates the device 1001 as the needles 1015 simultaneously advance partially out of the exit ports 1007 and into the vessel wall W at two target sites. As discussed above, the depth of the access (and therefore the thickness of the vessel wall layer) is determined by the height of the needles 1015 as they exit the exit ports 1007, as well as the height and shape of the needle opening. In some embodiments, the device 1001 includes tubes to cover the needles 1015 after they access the vessel wall W, for example in a similar manner to the embodiments discussed above with respect to FIGS. 4A and 4B. In some embodiments, the device 1001 includes three (or any other suitable number) infusion assemblies to access the vessel wall at three (or more) target sites simultaneously with one device 1001 (or without rotating or otherwise moving the distal portion 1010). Further, as discussed above, in some embodiments, the distal portion 1010 includes a mechanical expansion element (e.g., a braid, laser cut tube, shape memory device, and the like) in place of the balloon 1011 illustrated in FIGS. 10 and 11A-11C.

Figure 12A:
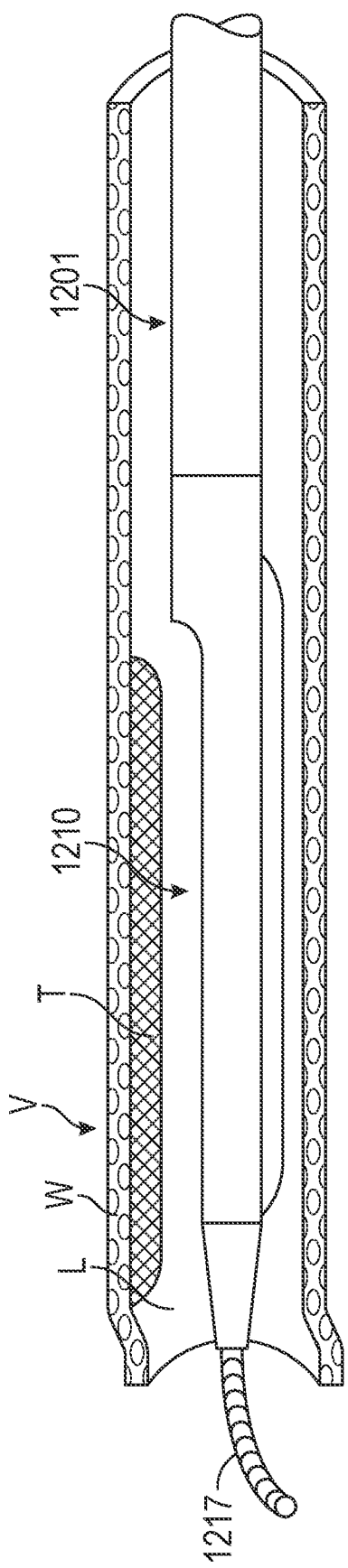
Figure 12B:
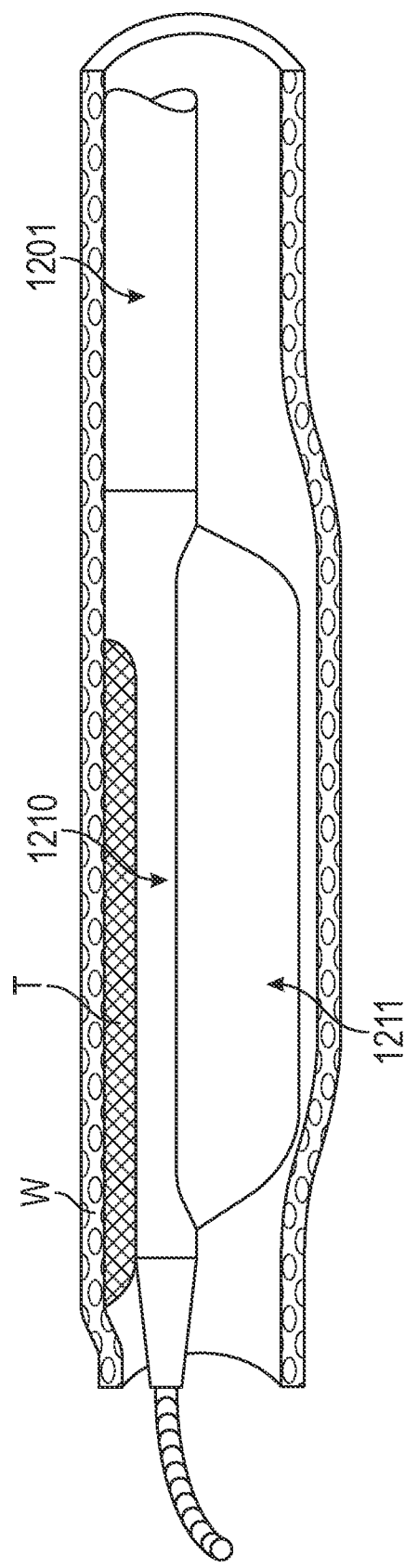

FIGS. 12A-12C are partially cross-sectional side views of a distal portion 1210 of an infusion device 1201 during various steps of an infusion procedure in accordance with some embodiments of the present technology. Like the embodiments discussed above, the infusion procedure can deliver an infusate into intravascular tissue or other intravascular structures, and/or between intravascular tissue and the inner wall of a vessel.

FIG. 12A illustrates the distal portion 1210 of the device 1201 being positioned over a guidewire 1217 at a target site of a vessel V (shown in cross-section). The vessel V is generally defined by a lumen L and a vessel wall W. Within the vessel lumen L is a layer of intraluminal tissue T, such as atherosclerotic plaque or thrombus. Once the distal portion 1210 is positioned at a target site proximate to the intravascular tissue T, the balloon 1211 can be inflated, as illustrated in FIG. 12B.

FIG. 12C illustrates a penetrating member 1240 as it is advanced into a layer of the tissue T and/or between the wall W and the tissue T. In the illustrated embodiment, the penetrating member 1240 does not need to pierce the vessel wall W, an instead can extend into the tissue T (e.g., at a depth between the tissue T and the inner wall W). Accordingly, in some embodiments, the penetrating member 1240 has a blunt, rounded, or atraumatic end to facilitate passage of the penetrating member 1240 between the tissue T and the vessel wall W (and/or into the tissue T at a depth apart from the vessel wall W) without a risk of inadvertently perforating the vessel wall. Further, in some embodiments, the device 1201 does not include a sheath that extends over the penetrating member 1240 during advancement and/or infusate delivery. In some embodiments, the penetrating member 1240 is a needle with a sharp distal tip (e.g., the needle 140 of FIG. 1).

During advancement of the penetrating member 1240, one or more fluids (e.g., a dissecting fluid and/or an infusate) can be delivered through a lumen in the penetrating member 1240 at a controlled pressure or flow rate. The pressure generated by the fluid flow can separate the layer between the tissue T and the wall W. Once the penetrating member 1240 has advanced a desired distance, an infusate can be delivered into the tissue T and/or between the tissue T and the vessel wall W. In some embodiments, the infusate is at least partially delivered through the penetrating member 1240 during the advancement step (e.g., in a diluted form in the dissection fluid). Although FIGS. 12A-12C refer to intravascular tissue, the device 1201 can operate in a similar fashion with respect to other anatomical or prosthetic structures within the vessel lumen L.

Figure 13B:
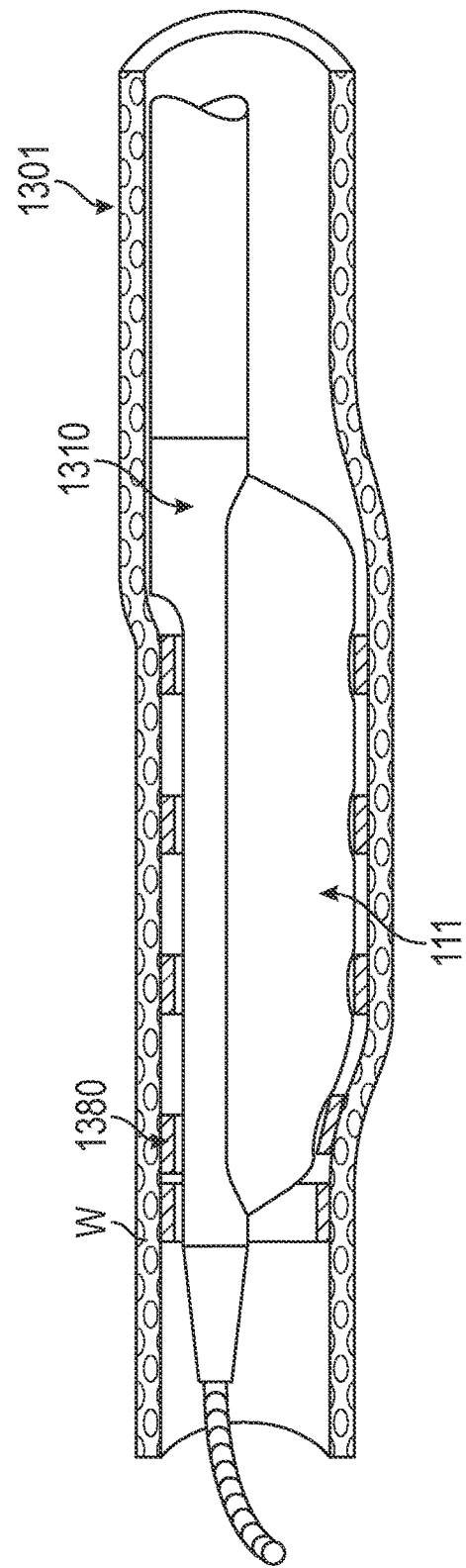
Figure 13C:
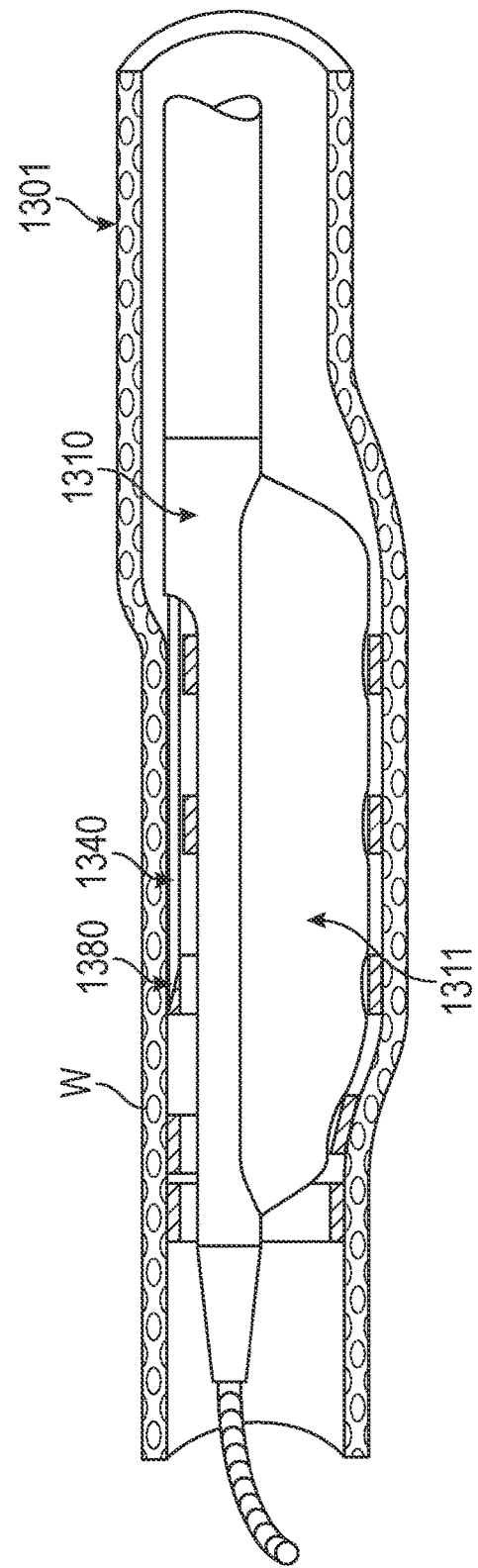

FIGS. 13A-13C are partially cross-sectional side views of a distal portion 1310 of an infusion device 1301 during various steps of an infusion procedure in accordance with embodiments of the present technology. FIG. 13A illustrates the distal portion 1310 of the device 1301 being positioned over a guidewire 1317 at adjacent a target site of a vessel V (shown in cross-section) that is at least partially defined by a lumen L and a vessel wall W. An intravascular implant 1380 (e.g., a stent, graft, or stent graft (also shown in cross section)) is positioned within the vessel lumen L. Once the distal portion 1310 is positioned adjacent the target site, the balloon 1311 is inflated, as illustrated in FIG. 13B.

FIG. 13C illustrates a penetrating member 1340 advanced between the wall W and the implant 1380. Like the penetrating member 1240 discussed above with respect to FIGS. 12A-12C, the penetrating member 1340 can have a blunt or rounded end to avoid unintentionally puncturing the vessel wall W and/or damaging the implant. During advancement of the penetrating member 1340, one or more fluids (e.g., a dissecting fluid and/or an infusate) can be delivered through a lumen of the penetrating member 1340 at a controlled pressure. The hydrostatic pressure generated by the fluid can separate the implant 1380 and the wall W, forming a space therebetween, and the penetrating member 1340 can advance into the space. Once the penetrating member 1340 has advanced a desired distance, the infusate can be delivered into the space. In some embodiments, the infusate is additionally (or alternatively) delivered through the penetrating member 1340 during the needle advancement step (e.g., in a diluted form in the dissection fluid).

In some embodiments, the tissue in the vessel wall W can grow around and/or through the implant 1380 over time (not shown). In some such embodiments, the penetrating member 1340 advances along a trajectory substantially parallel to the longitudinal axis of the distal portion 1310 through the tissue ingrowth and/or between the implant 1380 and the vessel wall W to deliver the infusate into the tissue. The infusate can then disperse into the vessel V. In some embodiments, the tissue penetrating member 1340 can deliver the infusate into an implant (not shown) that includes a thickness (e.g., a foam) and/or a cavity (e.g., an expandable member). In such embodiments, the infusate can then dispel from the implant over time (e.g., through porous walls of the implant, through openings in the implant, through valves of the implant, and the like).

All embodiments of an infusion device described above include a proximal handle (e.g., the handle 130 of FIG. 1) coupled to various components of the device. For example, returning to the description of FIG. 1, the needle 140 of device 101 can be connected (e.g., via a coupler element (not shown) such as a needle shaft) to the actuating component 150. In such embodiments, the actuating component is configured to advance and/or retract the needle 140 when the actuating component 150 is turned. In some embodiments, with reference to FIGS. 1, 4A, and 4B, the actuating component 150 additionally (or alternatively) advances the tube 442. In some embodiments, the actuating component 150 includes one or more subcomponents coupled to different components of the device 101. For example, a first subcomponent can be coupled to the needle 140, while a second subcomponent is coupled to the tube 442. Accordingly, in some embodiments, the needle 140 and the tube 442 can be advanced separately as required to access the wall layer then deliver the infusate (e.g., to puncture the wall then deliver the infusate through the through side holes 444 of the tube 442). The actuating component 150 allows a user to control the relative position of the needle 140 and/or the tube 442 with respect to the distal portion 110 (or each other). For example, the user may adjust the position of the needle 140 and/or the tube 442 based on the infusion procedural plan, the stage of the procedural, and/or intravascular or fluoroscopic images. In some embodiments, the actuating component 150 allows the needle 140 and/or the tube 442 to be advanced out of the first exit port 113a by a maximum distance equal to or less than the length of the rigid section of the distal portion 110. For example, the maximum distance can be between about 5 mm, about 30 mm, about 40 mm, or about 50 mm depending on the length of the distal portion 110.

As further illustrated in FIG. 1, the handle 130 can include a port 160 that is in fluid communication with the needle 140. In turn, the port 160 can be connected to a valve 162 (e.g., a stopcock or other suitable mechanism), and the valve 162 can be connected to two or more fluid lines (two shown). For example, a first fluid line can connect to an inflation device 164 filled with saline fluid for the hydrodissection step of the procedure, and a second fluid line can be connected to an infusion component 166 (e.g., a syringe or pump) with a drug or other therapeutic agent (referred to collectively as "the agent"). In various embodiments, the inflation device 164 and/or the infusion component 166 can include a syringe that can be manually controlled, an inflation device with a pressure gauge and a controller (or manual adjustment mechanism), and/or a pump with a controller. The controller can control volumetric flow rate, flow pressure, total flow infused, and/or any combination therein.

A procedure utilizing the device 101 can begin with the needle accessing the vessel wall. In some embodiments, the needle's access is at least partially facilitated through a hydrodissection that includes infusing pressurized saline (or other suitable fluid) using inflation device 164. Once the vessel wall layer is accessed and an intramural space is created, the valve 162 can be turned towards the line with the infusion component 166. In some embodiments, the infusate is then automatically delivered in a controllable matter, for example by a pump in the infusion component 166, into the intramural space. In some embodiments, the access is completed without a hydrodissection fluid, for example by directly advancing the needle 140 of the distal portion of the device and into a vessel wall layer. In some embodiments without the hydrodissection, the valve 162 is movable between a closed position and an open position with the infusion component 166. In some embodiments without the hydrodissection, the infusion component 166 includes an internal mechanism (e.g., a valve, switch, and the like) to regulate flow out of the infusion component 166. In some embodiments, the infusion component 166 is manually operated, allowing the infusate to be delivered at a manually controlled rate. In some such embodiments, the infusion component 166 includes an indicator that allows the user access to real time feedback about infusion pressure (e.g., a pressure gauge), a location of the needle and/or the tube (e.g., an location indicator based on the presence or absence of a pressure spike), and/or other relevant information. In some embodiments, delivery of the infusate can be automated such that the device 101 maintains a constant pressure during infusate delivery. In some embodiments, the valve 162 can be turned towards the line with the saline (or other suitable fluid) after delivering the infusate to provide a bolus of liquid. This can help ensure the infusate has been fully flushed from the device and delivered at the target site.

As further illustrated in FIG. 1, the handle 130 can include a port 170 that is connected to one or more of the lumens of FIG. 2, such as the guidewire lumen 221. In turn, the port 170 can be connected to a hemostasis valve (not shown) to allow for safe and sanitary introduction of guidewires and/or other suitable devices (e.g., the imaging component) down the guidewire lumen 221. The handle 130 also includes a balloon inflation port 180 that is fluidly connected to balloon 111 and allows connection of an inflation device (not shown) to inflate the balloon 111.

In various embodiments, the guidewire lumen 221 exits the shaft 120 at a location distal to the handle 130. This can accommodate various lengths of imaging catheters for use with system 100. For example, some imaging catheters may not be not long enough to extend from the distal end 110 of the shaft 120 through the handle 130, but may have a length suitable for extending from the distal end 110 of the shaft 120 to an exit at a port distal to handle 130. This embodiment can also reduce the components extending through the handle 130, thereby allowing for a lower profile handle and/or additional versatility for the system 100.

In some embodiments, the handle 130 has an actuator which can pull back the catheter shaft 120 and/or distal portion 110 while maintaining the position of the needle 140 in the vessel. During a procedure, this allows the distal portion 110 and the balloon 111 to be pulled away from the target site (at or near the puncture location or near the first exit port 113a) while the infusate is delivered. The removal of the distal portion 110 and the balloon 111 can allow a clearer visualization of the infusion, for example by an intravascular imaging catheter extending through the guidewire lumen 221 and/or by an external fluoroscopy component.

In various embodiments, the devices and/or their components discussed above can vary in size depending on the size of the target vessel or body conduit, the size of the target site, and/or the desired maximum flow rate through the device. For example, the needle can have a size of between about 20 gauge and about 35 gauge. In some embodiments, the needle can be smaller at the distal portion to facilitate access to the vessel wall, then step up in size and/or be connected to a larger tube so that flow resistance through the length of the lumen within the needle is reduced. Additionally, or alternatively, the expansion element (either a balloon or mechanical expansion), can expand to provide adequate vessel wall apposition in vessels and have a maximum inner diameter from about 6 mm up to about 22 mm.

In some embodiments, the device is coupled to an energy source that can be used in conjunction with intramural agent delivery to increase diffusion and uptake of the agent into the target site. Examples of energy sources include electric current, magnetic field, ultrasound, pulsed light, or temperature, each of which are expected to improve the efficiency of the infusate delivery and/or absorption by the tissue. The energy source can be carried by and/or incorporated into the distal portion of the device. For example, an electrode can be attached to the distal portion of the device to generate an electric current, magnetic field, and/or an ultrasound pulse. Additionally, or alternatively, a separate tool catheter can be deployed in a central lumen of the device (e.g., within the guidewire lumen 221 (FIG. 2)). Additionally, or alternatively, the device can be removed and replaced with an energy catheter which is activated after the agent is delivered during the infusion step. Additionally, or alternatively, various manual techniques such as squeezing or massaging the patient from the outside (e.g., along the leg) can be used in conjunction with the infusion, including in conjunction with real time imaging of the infusion.

In some embodiments, the infusion delivery device is coupled with another therapeutic device. For example, the guidewire lumen 221 (FIG. 2) of the infusion delivery device can be configured to deliver a balloon dilatation catheter, a stent delivery device, a thrombectomy device, and/or any other relevant interventional treatment device to provide an interventional therapy in conjunction with the infusion. Additionally, or alternatively, the infusion delivery device can perform an infusion procedure, then be removed and replaced with a therapy catheter to perform an interventional therapy. Additionally, or alternatively, the therapy device can be used first, then the infusion delivery device can perform an infusion procedure.

Selected Applications of Infusion Devices

In one embodiment a method of using a device of the type disclosed above with reference to FIGS. 1-4B, the device is inserted over a guidewire and into a vessel via an access site remote from the treatment site using standard intravascular techniques and equipment. The distal portion of the device is positioned at a target site within the vessel. In some embodiments, the guidewire is then removed from the guidewire lumen and replaced with an intravascular imaging component (e.g., an IVUS catheter).

The balloon (or other expansion element), is then expanded such that the vessel wall is pressed against the transition portion and the offset surface of the distal portion 110. The needle, which is connected to a pressurized fluid source (e.g., saline), is then advanced from the first exit port and pierces the vessel wall, then pressurized fluid is used to further access an intramural space within the vessel wall. That is, once the distal opening of the needle is completely enclosed by the vessel wall, the fluid builds up pressure and creates an intramural space. In various embodiments, the pressure of the fluid may be between about 1 atmosphere (atm) and about 4 atm. The needle continues to advance for a first distance after puncturing the vessel wall (e.g., between about 3 mm and about 6 mm), then the tapered tube is advanced to cover the tip of the needle. The needle and the tube are then advanced together for a second distance (e.g., in a range between about 0.5 cm and about 3 cm) as the pressurized fluid from the needle creates an intramural space in between the vessel wall layers.

The imaging component can then be advanced through the guidewire lumen 221 (or another suitable lumen) and positioned such that the imaging component can provide images and/or measurements related to the puncturing and access into the intramural layers. The imaging component can also provide images that help visualize the intramural space created therein.

Once the position of the needle 140 within the intramural layers is confirmed, the valve 162 can be actuated to deliver an infusate (e.g., a drug or other therapeutic agent) into the intramural space. The infusate can be mixed with a contrasting agent so that infusion can be viewed more easily through fluoroscopy devices. The infusate can additionally, or alternatively, be mixed with an echogenic agent (e.g., gas-filled microbubbles, such as air bubbles, or suspended particles) such that the infusion can be visualized in cross section using the imaging component. The user can control the flow rate and volume of the infusates delivered until an adequate area is treated and/or an adequate infusates volume is delivered and/or absorbed. In some embodiments, the user can use the imaging information to determine an optimal volume, pressure, and/or flow rate, or base the infusion on a predetermined volume of an infusate. In some embodiments, the infusate can be delivered at a steady flow rate and/or a steady pressure until the desired distribution or volume of the infusate is delivered and/or absorbed.

In some embodiments, the infusion pressure is generally equal to or less than the pressure that was used to access the tissue layer and create the intramural space. In some embodiments, the infusion pressure is higher (e.g., in a range between about 4 atm and about 10 atm) to increase the size of the intramural space and the drug dispersion area. For example, the infusion pressure can be set to achieve a specific circumferential distribution of an infusate, for example encompassing 90, 180, 270, or 360 degrees of vessel wall. In some embodiments, the infusion pressure can be set to achieve a specific longitudinal distribution of the infusate (e.g., about 1 cm, 3 cm, 5 cm, and/or another distance from the puncture site).

In some embodiments, the infusate can be delivered in a pulsed manner, either pulsed pressure or pulsed flow until the desired distribution or volume of the infusate is delivered. A pulsed flow can be paired with real time cross-sectional imaging at a pre-specified target distance from the puncture location (e.g., about 3 cm caudal or cranial to the puncture location), as a means to determine if the hydrodissection fluid or infusate mixture has reached the pre-specified target distance. For example, the analysis can include a real-time imaging interpretation of pulsed or dynamic movement within the appropriate intramural or extra vascular layers at the pre-specified target distance. In some embodiments, the infusion can occur while the balloon 111 is inflated. Alternately, the intramural space can be created while the balloon 111 is inflated, then the balloon 111 can be deflated while (or before) the infusate is being delivered so that the vessel V is not compressed during the delivery. In some embodiments, the distal portion 110 is pulled back during the infusion stage of the procedure. In some embodiments, the needle can deliver at least a portion of the infusate during the needle advancement step (e.g., an initial dose that can be absorbed while the intramural space is created).

In some embodiments, the pressurized fluid used to access the vessel wall W and create the intramural space includes a diluted amount of the infusate. In such embodiments, the needle 140 is advanced to a desired length and the pressurized fluid is delivered until a desired distribution area on the vessel wall receives the infusate and/or a desired volume is delivered.

Various tissue characteristics can affect an ideal infusion pressure to achieve a predetermined distribution area (e.g., corresponding to predetermined target treatment site). For example, a thickened fibrotic vessel wall can require a higher infusion pressure than a normal vessel wall. Accordingly, in various embodiments, the infusion pressure to achieve the predetermined distribution area can be as high as about 10 atm, as low as about 2 atm, and/or dynamically adjusted throughout the procedure (e.g., based on intravascular or fluoroscopic imaging and/or a position of the needle 140), until the predetermined distribution area is achieved. The predetermined distribution area can be of a particular circumferential coverage around the vessel, (e.g., 90, 180, 270 or 360 degrees around the vessel). Additionally, or alternatively, the predetermined distribution area can be of a particular length along the vessel (e.g. about 1 centimeter (cm), about 3 cm, or about 5 cm in one or both directions from the target site). Once the predetermined distribution area is achieved, the infusion pressure can be lowered to deliver a desired total volume of infusate without increasing the size of the distribution area further.

In some embodiments, the device 101 can be configured to penetrate, advance, and deliver an infusate between specific and/or predetermined layers of the vessel wall (e.g., at a predetermined layer, at a predetermined depth, etc.). For example, in various embodiments, the device 101 is configured to specifically access the medial layer of an artery or vein, the adventitial layer of an artery or vein, the perivascular space around the vessel, and/or any other suitable layer or depth. In some embodiments, the device 101 is configured to extend between intravascular tissue, such as between the thrombus or atherosclerotic plaque and the vessel wall, and/or into the intravascular tissue itself. The device 101 can also be configured such that the needle height is dynamically adjustable. In some such embodiments, the user can adjust the needle height to selectively access one or more layers of the vessel wall (e.g., the medial, adventitial, or perivascular layers of the vessel wall) during the procedure. The needle height adjustment can additionally (or alternatively) be used to accommodate vessels with varying wall thicknesses (e.g., to adjust operation of the device 101 to a particular patient anatomy, to selectively access a desired layer in the vessel wall, and the like). In some embodiments, the user can use imaging information (e.g., from an IVUS) of an initial infusion to adjust the needle height for a subsequent infusion.

In some embodiments, after the device 101 is used to deliver an infusate to an intramural layer of a vessel wall (with the balloon either inflated or deflated), the distal portion 110 is re-positioned adjacent the target site (e.g., re-advanced if it was pulled back in a previous step) and the balloon 111 is re-inflated to compress the intramural layer such that the infusate is further dispersed in the layer of the vessel wall, and/or outward from the layer into outer layers (e.g., the adventitial layers or perivascular space surrounding the vessel) to aid in infusate dispersion into the vessel wall layers. Additionally, or alternatively, after the device 101 is used to deliver the infusate to an intramural layer of a vessel wall, the device 101 can be pulled back and a separate expandable catheter (e.g., a separate balloon catheter) can be advanced through the guidewire lumen 221 to the target site. In embodiments in which an imaging component and/or the guidewire 317 were in the guidewire lumen 221 at this stage of the procedure, the imaging component and/or the guidewire 317 are removed prior to introduction of a separate expandable catheter.

The separate expandable catheter size is selected to be larger than the vessel diameter, for example 110% or 120% of the vessel diameter, such that it will compress the vessel wall when expanded and further disperse the infusate in the wall layer, and/or outward from the layer into outer wall layers and/or perivascular space. In some embodiments, the separate expandable catheter does not have a rigid offset surface such that dispersion with the separate expandable catheter more uniformly compresses the vessel wall. For example, the separate expandable catheter can include an inflatable balloon that partially contorts to apply a generally even pressure across the vessel wall. The separate expandable catheter can also have a desired therapeutic effect on the vessel, for example when the procedure is treating a narrowing vessel and/or an occlusion.

In many of the embodiments discussed above, the infusion device can be re-used at multiple locations to deliver the infusate at multiple locations along a vessel, thereby treating more locations than can be accommodated by a single puncture and infusate location. In some embodiments, real-time imaging information gained during the previous puncture can help dictate where the next puncture and infusion should take place.

In some embodiments, the device 101 is used to deliver an infusate to an intramural layer of a vessel wall. After the infusate delivery, the device 101 is pulled back, a separate stent delivery catheter is advanced through the guidewire lumen 221, and a stent is implanted at the target site. The stent delivery procedure can be used, for example, when the target site has a narrowing vessel and/or stenosis compromising flow through the vessel. The stent implantation is the primary therapy for the procedure, but the preliminary infusate delivery from the device 101 is expected to mitigate various undesired negative effects of the stent implantation (e.g., vessel irritation).

In some embodiments, as discussed above with respect to FIGS. 13A-13C, an implant (e.g. the stent) is already implanted in the vessel, either during the same procedure as the infusate delivery, or at a prior time (e.g., a prior procedure). In some such embodiments, the device 101 and/or components thereof are configured to be advanced between the implant and the vessel wall. For example, the device 101 can be advanced to the site of a stent implantation with the first exit port 113a positioned at a location adjacent to the proximal edge of the stent. The needle 140 can then be advanced out of the first exit port 113a and between the stent and the vessel wall. If restenotic or other tissue already exists intraluminal to the stent, the needle 140 can advance into the restenotic tissue itself (e.g., advanced through tissue within the stent and/or or between the stent and the tissue rather than between the stent and the vessel wall). In some embodiments, the needle 140 is advanced along a substantially straight path generally parallel to the support surface and/or the longitudinal axis of the device 101. In various embodiments, the infusate can be delivered during needle advancement and/or after the needle has completed advancement a desired distance at the target site.

Types of drugs that can mitigate the effects of restenosis as the infusate in any of the examples above include anti-thrombotic, anti-proliferative, anti-inflammatory drugs, or some combination therein. Examples include paclitaxel, sirolimus, everolimus, heparin, dexamethasone, or the flavonoid family of drugs. Drug mixtures may also be injected as the infusate. Additionally, drug-impregnated microspheres can be delivered by the device 101. Microspheres for controlled release of drugs are typically made from bioabsorbable polymers such as the polylactic acid family of polymers (PLA, PDLA, PLLA) and range in size from about 10 microns (μm) to about 20 μm (e.g., about 0.0004 inches to about 0.0008 inches). Drug-impregnated microspheres injected into an intramural space of a vessel wall can extend the therapeutic effect of an infusate for a desired period. Additionally, or alternatively, a drug-impregnated polymer can be directly injected into the intramural space to prolong the diffusion of an infusate at the target tissue area. Examples of injectable polymers include polylactic acid polymers such as PLLA or PDLA diluted with a biocompatible solvent such as N-methyl-2-pyrrolidone (NMP). Dilutions can vary depending on the required viscosity for injection and the desired final material characteristics. For example, the dilution can be about 50:50 PDLA and NMP.

In yet further embodiments, infusate delivery can be used in conjunction with treatment of thrombosis in the vein to mitigate post-thrombotic syndrome. For example, for patients with deep vein thrombosis (DVT), removal of thrombus either through natural causes or treatment can often lead to thrombotic obstruction, valvular incompetence, or a combination of, thereby causing an array of clinical symptoms such as leg pain, leg heaviness, vein dilation, edema, skin pigmentation, and/or venous ulcers (known collectively as post-thrombotic syndrome (PTS)). In some embodiments, the infusate delivery device is used to deliver infusates that have the potential to reduce the incidence of PTS, such as anti-inflammatory drugs into an intramural layer of the vessel wall. In some embodiments, the infusate delivery device is used to deliver anti-inflammatory drugs into a space between residual thrombus and the vessel wall and/or into the thrombus itself. Examples include corticosteroids such as dexamethasone, anti-thrombotic infusates such as heparin, or some combination. The infusate delivery can occur after a thrombectomy procedure has been performed and the occlusive clot has been removed. Alternately, an infusate delivery procedure can be performed on patients who have previously had a DVT, or who may or may not have been treated for the DVT but are nonetheless at risk for PTS.

In some embodiments, infusate delivery can be used in conjunction with various other treatments of patients at risk for aortic aneurysm or dissection. For example, a breakdown in elastin and collagen can cause an aortic wall to weaken, leading to increased risk of aneurysm dissection or ulcers. An intramural delivery of an infusate (e.g., anti-inflammatory agent such as doxycycline) to the weakened aortic wall can counteract the effects of degradation of elastin and collagen. Additionally, or alternatively, the device can be used to inject collagen or biocompatible or bioabsorbable polymers (such as the injectable polymers described above), or adhesives to strengthen the aortic wall. These treatments are expected to reduce the risk of aortic rupture or dissection, both of which have catastrophic and often fatal consequences.

EXAMPLES

The following examples are included to further describe some aspects of the present technology, and should not be used to limit the scope of the invention.

1. An infusion device, comprising:
   a handle assembly;
   a catheter shaft having a proximal end portion coupled to the handle assembly and a distal end portion, wherein the catheter shaft includes:
   a lumen extending from the proximal end portion to the distal end portion;
   a housing at the distal end portion having an exit port in communication with the lumen, a transition surface adjacent the exit port, and an offset surface distal to the exit port, wherein the exit port is spaced apart from the offset surface by a distance, and wherein the transition surface and the offset surface are configured to contact and at least partially conform a tissue wall to a shape of the transition surface and the offset surface
   a height adjustment component configured to adjust the distance between the exit port and the offset surface; and
   an expandable component at the distal end portion configured to press the transition surface and the offset surface against the tissue wall; and
   a tissue penetrating component slidably positioned within the lumen, the tissue penetrating component configured to create a space within the tissue wall and deliver an infusate into the space.

2. The infusion device of example 1 wherein the tissue penetrating component is further configured to exit the lumen through the exit port and travel along a path parallel to a longitudinal axis of the catheter shaft at the distal end portion.
3. The infusion device of example 1 or 2 wherein the height adjustment component comprises:
a rotatable guide component positioned within the lumen; and
a track carried by the rotatable guide component, wherein the tissue penetrating component is slidably positioned within the track.
4. The infusion device of any one of the preceding examples wherein the tissue penetrating component comprises a distal opening and a plug at least partially blocking the distal opening, wherein the plug is configured to offset the distal opening at least partially from a central axis of the tissue penetrating component.
5. The infusion device of any one of the preceding examples wherein the handle assembly comprises a valve in fluid communication with the tissue penetrating component, and wherein the valve is controllable between a dissection fluid supply and an infusate supply.
6. The infusion device of any one of the preceding examples wherein the tissue penetrating component comprises:
a needle; and
a protective tube coaxially surrounding the needle, wherein the needle is configured to advance distal to the protective tube to penetrate a surface of the tissue wall, and wherein the protective tube is configured to advance distal to the needle to protect the tissue wall after the needle penetrates the surface of the tissue wall.
7. The infusion device of claim 6 wherein the protective tube comprises one or more side holes configured to direct the infusate into the space in the tissue wall in an at least partially transverse direction relative to a longitudinal axis of the catheter shaft.
8. The infusion device of any one of the preceding examples wherein:
the lumen is a first lumen;
the exit port is a first exit port;
the catheter shaft further comprises a second lumen extending from the proximal end portion to the distal end portion; and
the housing comprises a second exit port connected to the second lumen.
9. The infusion device of claim 8, further comprising an imaging component slidably positioned within the second lumen.
10. The infusion device of claim 8, further comprising a guidewire slidably positioned within the second lumen.
11. An infusate delivery system, comprising:
a handle assembly comprising a fluid control valve;
a catheter shaft having a proximal portion coupled to the handle assembly, a distal portion opposite the proximal portion, and a lumen extending through the catheter shaft, wherein the distal portion comprises—
a housing having at least one engagement surface configured to engage a vessel wall at a target site;
an exit port in communication with the lumen; and
an expandable component carried by the housing and opposite the at least one engagement surface; and
a tissue manipulation device slidably positioned within the lumen, the tissue manipulation device configured to manipulate the vessel wall to access an intramural space of the vessel wall and deliver an infusate into the vessel wall,
wherein the fluid control valve is controllable to alter a fluid supplied to the tissue manipulation device between a dissection fluid supply and an infusate supply.
12. The infusate delivery system of example 11 wherein the infusate comprises a therapeutic agent including at least one of an anti-thrombotic drug, anti-proliferative drug, and an anti-inflammatory drug.
13. The infusate delivery system of example 12 wherein the therapeutic agent comprises at least one of paclitaxel, sirolimus, everolimus, heparin, dexamethasone, and a flavonoid drug.
14. The infusate delivery system of any one of the preceding examples wherein:
the lumen is a first lumen;
the expandable component is an expandable balloon; and
the catheter shaft has a second lumen in fluid communication with the expandable balloon.
15. The infusate delivery system of any one of the preceding examples wherein the tissue manipulation device comprises:
a tube carried by the lumen of the catheter shaft and having a tube lumen; and
a needle carried by and positioned within the tube lumen, wherein the needle is configured to advance beyond the tube to penetrate the vessel wall to access the internal layer, and wherein the tube is configured to advance beyond the needle to protect the internal layer from the needle.
16. A method of intravascularly delivering a therapeutic agent to a target site, the method comprising:
positioning a distal portion of a catheter shaft of an infusion device at a target site within a vein of a patient;
pressing an engagement surface of a housing at the distal end of the catheter shaft against a venous wall such that the venous wall conforms to the engagement surface;
extending a needle of the infusion device through an exit port at the distal portion of the catheter shaft to penetrate the venous wall at the target site to access intramural space within the venous wall;
moving the needle within the intramural space in a direction generally aligned with a longitudinal axis of the catheter shaft; and
delivering, through the needle, a drug to the intramural space within the venous wall.
17. The method of example 16 wherein the lumen of the catheter shaft is a first lumen, and wherein the method further comprises:
advancing an imaging component through a second lumen of the catheter shaft to the target site; and
while penetrating the venous wall at the target site, obtaining intravascular images of the venous wall at the target site.
18. The method of any one of the preceding examples wherein pressing the engagement surface against the venous wall comprises expanding a balloon positioned on a side of the catheter shaft facing away from the engagement surface.
19. The method of any one of the preceding examples wherein the target site is a first target site and the intramural space is a first intramural space, and wherein the method further comprises, after delivering the drug to the first target site:
retracting the needle into the lumen;

separating the engagement surface of the housing from the venous wall;
positioning the distal portion of the infusion device at a second target site within the vein;
extending the through the exit port to penetrate the venous wall at the second target site to access a second intramural space within the venous wall;
delivering, through the needle, the drug to the second intramural space within the venous wall.

20. A method of intravascularly delivering a therapeutic agent to a patient diagnosed with deep vein thrombosis, the method comprising:
positioning a distal portion of a catheter device at a target site within a vein of the patient;
penetrating a venous wall at the target site with a needle of the catheter device to access perivascular space adjacent to an outer surface of the venous wall; and
delivering a drug to prevent post thrombotic syndrome.

21. The method of example 20, further comprising moving the needle within the perivascular space in a direction generally aligned with a longitudinal axis of the catheter device.

22. An intravascular drug infusion device as disclosed herein.

23. A device as disclosed herein.

24. A system for infusing a substance into a vessel wall as disclosed herein.

25. A system as disclosed herein.

26. A method of infusing a substance between layers of a vessel wall as disclosed herein.

27. A method as disclosed herein.

28. The method of example 27 wherein delivering the drug comprises delivering an anti-inflammatory drug.

CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments can perform steps in a different order. The various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

We claim:

1. A method of intravascularly delivering a therapeutic agent to a target site, the method comprising:
positioning a distal portion of a catheter shaft of an infusion device at a target site within a vein of a patient;
pressing an engagement surface of a housing at the distal portion of the catheter shaft against a venous wall such that the venous wall conforms to the engagement surface to position an exit port at the distal portion of the catheter shaft adjacent to the venous wall at the target site;
actuating an adjustable height component positioned at the distal portion of the catheter shaft to transition a lowermost surface of a needle of the infusion device from a first height to a second height above a support surface at the distal portion of the catheter shaft, wherein, after the actuating, the adjustable height component is positioned to direct the needle into the venous wall with the lowermost surface at the second height;
extending the needle through the exit port to penetrate the venous wall at the target site at the second height to access an intramural space within the venous wall;
moving the needle within the intramural space in a direction generally aligned with a longitudinal axis of the catheter shaft; and
delivering, through the needle, a drug to the intramural space within the venous wall.

2. The method of claim 1 wherein the needle of the infusion device is slidably positioned within a first lumen of the catheter shaft terminating at the exit port, and wherein the method further comprises:
advancing an imaging component through a second lumen of the catheter shaft to the target site; and
while penetrating the venous wall at the target site, obtaining intravascular images of the venous wall at the target site.

3. The method of claim 1 wherein pressing the engagement surface against the venous wall comprises expanding a balloon positioned on a side of the catheter shaft facing away from the engagement surface.

4. The method of claim 1 wherein the target site is a first target site and the intramural space is a first intramural space, and wherein the method further comprises, after delivering the drug to the first target site:
retracting the needle into a lumen fluidly coupled to the exit port;
separating the engagement surface of the housing from the venous wall;
positioning the distal portion of the infusion device at a second target site within the vein;
extending the needle through the exit port to penetrate the venous wall at the second target site to access a second intramural space within the venous wall; and
delivering, through the needle, the drug to the second intramural space within the venous wall.

5. The method of claim 1 wherein actuating the adjustable height component includes rotating a rotatable guide component at the distal portion of the catheter shaft to position a track of the adjustable height component to transition the lowermost surface of the needle between the first height and the second height.

6. A method of intravascularly delivering an anti-inflammatory drug to a blood vessel wall, the method comprising:
positioning a distal portion of a catheter shaft of an infusion device at a target site within a vein of a patient;
pressing an engagement surface of a housing at the distal portion of the catheter shaft against a venous wall such that the venous wall conforms to the engagement surface;
extending a fluid delivery tool of the infusion device through an exit port at the distal portion of the catheter shaft to access an intramural space between layers of the venous wall at the target site;
advancing the fluid delivery tool into the intramural space between the layers of the venous wall in a direction generally aligned with a longitudinal axis of the catheter shaft;
delivering, through the fluid delivery tool, the anti-inflammatory drug to the intramural space between the layers of the venous wall to cause the anti-inflammatory drug to be absorbed by the layers of the venous wall at the target site to reduce inflammation adjacent to the target site; and
actuating a height adjustment component positioned at the exit port of the catheter shaft to adjust an axial-most surface of the fluid delivery tool from a first set distance away from the engagement surface to a second set distance away from the engagement surface different from the first set distance.

7. The method of claim 6 wherein:
advancing the fluid delivery tool within the intramural space includes delivering a hydrodissection fluid, through the fluid delivery tool, to the intramural space to expand the intramural space; and
the method further comprises actuating a valve proximal to the distal portion to switch from a hydrodissection fluid source to an infusion component to supply the anti-inflammatory drug to the fluid delivery tool.

8. The method of claim 7 wherein the hydrodissection fluid source provides the hydrodissection fluid to the fluid delivery tool at a first fluid pressure and wherein the infusion component provides the anti-inflammatory drug to the fluid delivery tool at a second fluid pressure different from the first fluid pressure.

9. The method of claim 6:
the fluid delivery tool comprises a needle and a tube configured to slide over the needle, wherein the tube includes an end port and one or more side holes;
extending the fluid delivery tool through the exit port includes advancing the needle through the exit port to penetrate the venous wall at the target site to access the intramural space;
the method further comprises advancing the tube over the needle after accessing the intramural space such that the needle is positioned proximal to the one or more side holes; and
delivering the anti-inflammatory drug to the intramural space includes delivering the anti-inflammatory drug through the end port and the one or more side holes of the tube to increase an area of the intramural space between the layers of the venous wall absorbing the anti-inflammatory drug.

10. The method of claim 6, wherein the target site is a first target site and the intramural space is a first intramural space, and wherein the method further comprises, after delivering the anti-inflammatory drug to the first intramural space:
positioning the distal portion of the catheter shaft of the infusion device at a second target site within the vein;
advancing the fluid delivery tool through the exit port between the layers of the venous wall at the second target site to access a second intramural space within the venous wall; and
delivering, through the fluid delivery tool, the anti-inflammatory drug to the second intramural space between the layers of the venous wall.

11. The method of claim 6 wherein the fluid delivery tool is advanced into the intramural space between the layers of the venous wall without hydrodissecting the venous wall.

12. The method of claim 6, further comprising:
determining a delivery pressure for the anti-inflammatory drug based on characteristics of the venous wall to deliver the anti-inflammatory drug to a predetermined distribution area between the layers of the venous wall, wherein the predetermined distribution area is configured to increase absorption of the anti-inflammatory drug, and
wherein delivering the anti-inflammatory drug to the intramural space between the layers of the venous wall comprises delivering the anti-inflammatory drug at the determined pressure.

13. The method of claim 6, further comprising delivering, via an energy source at the distal portion of the catheter shaft, energy to the venous wall after delivering the anti-inflammatory drug to increase absorption of the anti-inflammatory drug.

* * * * *